(12) United States Patent
Fujimoto et al.

(10) Patent No.: US 12,498,964 B2
(45) Date of Patent: Dec. 16, 2025

(54) SERVER DELAY CONTROL DEVICE, SERVER DELAY CONTROL METHOD AND PROGRAM

(71) Applicant: NTT, Inc., Tokyo (JP)

(72) Inventors: Kei Fujimoto, Musashino (JP); Ko Natori, Musashino (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/832,245

(22) PCT Filed: Jan. 25, 2022

(86) PCT No.: PCT/JP2022/002637
§ 371 (c)(1),
(2) Date: Jul. 23, 2024

(87) PCT Pub. No.: WO2023/144878
PCT Pub. Date: Aug. 3, 2023

(65) Prior Publication Data
US 2025/0103382 A1    Mar. 27, 2025

(51) Int. Cl.
*G06F 9/48* (2006.01)
*G06F 1/3296* (2019.01)

(52) U.S. Cl.
CPC .......... *G06F 9/4812* (2013.01); *G06F 1/3296* (2013.01)

(58) Field of Classification Search
None
See application file for complete search history.

(56) References Cited

U.S. PATENT DOCUMENTS

| | | | | |
|---|---|---|---|---|
| 11,281,473 | B2 * | 3/2022 | Vrabel | G06F 1/28 |
| 2010/0077394 | A1 * | 3/2010 | Wang | G06F 9/4812 |
| | | | | 718/1 |
| 2014/0173314 | A1 * | 6/2014 | Min | G06F 1/3206 |
| | | | | 713/323 |
| 2023/0029932 | A1 | 2/2023 | Fujimoto | |

FOREIGN PATENT DOCUMENTS

WO    WO 2021130828    7/2021

OTHER PUBLICATIONS

LWN.net [online], "New API," Feb. 2002, retrieved on Jul. 16, 2024, retrieved from URL <http://lwn.net/2002/0321/a/napi-howto.php3>, 10 pages.

* cited by examiner

*Primary Examiner* — Michael Sun
(74) *Attorney, Agent, or Firm* — Fish & Richardson P.C.

(57) ABSTRACT

A server delay controller includes: a sleep management unit that makes a thread sleep when no packet arrives for a predetermined period and cancels the sleep of the thread with a hardware interrupt when the packet arrives; a HW interrupt frequency management table that stores the number of times of hardware interrupt; and a HW interrupt frequency control unit that calculates a HW interrupt frequency on the basis of the number of times of hardware interrupt and controls HW interrupt permission or prohibition by sleep of the sleep management unit on the basis of the calculated HW interrupt frequency.

7 Claims, 16 Drawing Sheets

SERVER DELAY CONTROL DEVICE, SERVER DELAY CONTROL METHOD AND PROGRAM

CROSS-REFERENCE TO RELATED APPLICATIONS

This application is a National Stage application under 35 U.S.C. § 371 of International Application No. PCT/JP2022/002637, having an International Filing Date of Jan. 25, 2022. The disclosure of the prior application is considered part of the disclosure of this application, and is incorporated by reference in its entirety into this application.

TECHNICAL FIELD

The present invention relates to a server delay control device, a server delay control method, and a program.

BACKGROUND ART

A system is constructed and operated for each service, under the background of the progress of virtualization technology promoted by the network functions virtualization (NFV). Further, there is a mode in which a service function is divided into reusable module units, and the divided units are operated in an independent virtual machine (VM, a container, or the like) environment and are used like components as necessary, to improve operability. This mode is called service function chaining (SFC), and is replacing the above mode in which a system is constructed for each service and becoming a mainstream.

As a technology for forming a virtual machine, a hypervisor environment that includes Linux (registered trademark) and a kernel-based virtual machine (KVM) is known. In this environment, a host OS (an OS installed in a physical server is called a host OS) into which a KVM module is incorporated operates as a hypervisor in a memory area called a kernel space different from a user space. In this environment, a virtual machine operates in the user space, and a guest OS (an OS installed in a virtual machine is called a guest OS) operates in the virtual machine.

Unlike the physical server in which the host OS operates, the virtual machine in which the guest OS operates is designed so that all the hardware (HW) including a network device (typically an Ethernet card device or the like) is register-controlled, which is necessary for interrupt processing from the HW to the guest OS and writing from the guest OS into the hardware. In such register control, notifications and processing that should be originally performed by physical hardware are emulated by software, and therefore, performance is normally lower than that in the host OS environment.

To counter this performance deterioration, there is a technology for reducing HW emulation from a guest OS to a host OS or an external process existing outside its own virtual machine, and thus, enhancing communication performance and versatility with a high-speed and unified interface. As this technology, a device abstraction technology called virtio, which is a quasi-virtualization technology, has been developed and already been incorporated into many kinds of general-purpose OSs such as Linux (registered trademark) and FreeBSD (registered trademark), and is currently being used.

In virtio, regarding data input/output such as consoles, file input/output, and network communication, a data exchange through a queue designed with a ring buffer is defined by a queue operation as a single direction transfer transport of transferred data. With utilization of the queue specification of virtio, the number and the size of queues suitable for each device are prepared at a time of activation of the guest OS. Thus, communication between the guest OS and the outside of its own virtual machine can be performed only through an operation using a queue, without execution of hardware emulation.

[Packet Transfer by Polling Model (Example of DPDK)]

A method for connecting and associating virtual machines with each other is called inter-VM communication, and, in a large-scale environment such as a data center, virtual switches have been normally used for connection between VMs. However, because this method requires a large communication delay, higher-speed methods have been newly proposed. Examples of the proposed methods include a method using special hardware called single root I/O virtualization (SR-IOV), a method implemented by software using an Intel data plane development kit (hereinafter referred to as DPDK) that is a high-speed packet processing library, and the like.

The DPDK is a framework for performing network interface card (NIC) control, which has conventionally been performed by a Linux kernel (registered trademark), in a user space. The largest difference from the processing in the Linux kernel lies in that the DPDK has a polling-based reception mechanism called a pull mode driver (PMD). Regularly, in a Linux kernel, an interrupt occurs when data reaches the NIC, and reception processing is performed in response to the interrupt. On the other hand, in the PMD, a dedicated thread continuously performs data arrival checking and reception processing, which eliminates overheads such as context switches and interrupts to perform high-speed packet processing. The DPDK greatly improves performance and throughput of the packet processing, allowing reservation of more time for data plane application processing.

The DPDK exclusively uses computer resources such as a central processing unit (CPU) and a NIC. For this reason, it is difficult to use the DPDK for an application like the SFC flexibly switching the computer resources for respective modules. There is a soft patch panel (SPP) that is an application for alleviating the above described problem. The SPP is configured to prepare a shared memory between VMs and to make each VM (Virtual Machine) able to directly refer to the same memory space, so that packet copying in a virtualization layer can be omitted. Further, speeding up of packet exchange between a physical NIC and the shared memory can be achieved using the DPDK. The SPP can change input destinations and output destinations of packets using software by controlling a reference destination of each VM for a memory exchange. Through this processing, the SPP performs dynamic connection switching between VMs or between a VM and a physical NIC.

[Rx-Side Packet Processing by New API (NAPI)]

FIG. 13 is a schematic diagram of Rx-side packet processing by a New API (NAPI) implemented in Linux kernel 2.5/2.6 or later (see Non Patent Literature 1).

As illustrated in FIG. 13, the New API (NAPI) executes a packet processing APL 1 arranged in a user space 60 that can be used by a user on a server including an OS 70 (a host OS, for example), and performs packet transfer between a NIC 11 of HW 10 connected to the OS 70 and the packet processing APL 1.

The OS 70 includes a kernel 71, a ring buffer 72, and a driver 73, and the kernel 71 includes a protocol processing unit 74.

The kernel 71 performs a function of a core portion of the OS 70 (a host OS, for example), and manages monitoring of hardware and an execution state of a program for each process. Here, the kernel 71 responds to a request from the packet processing APL 1, and transmits a request from the HW 10 to the packet processing APL 1. The kernel 71 processes the request from the packet processing APL 1 via a system call (processing request from "a user program operating in unprivileged mode" to "a kernel operating in privileged mode").

The kernel 71 transmits a packet to the packet processing APL 1 via a socket 75. The kernel 71 receives a packet from the packet processing APL 1 via the socket 75.

The ring buffer 72 is managed by the kernel 71, and is placed in a memory space in the server. The ring buffer 72 is a buffer of a definite size that stores messages output from the kernel 71 as a log, and is overwritten starting from the head when its upper limit size is exceeded.

The driver 73 is a device driver for monitoring hardware in the kernel 71. Note that the driver 73 depends on the kernel 71, and turns into a different device driver when a created (built) kernel source changes. In this case, a corresponding program source of the different device driver should be obtained and the different device driver should be rebuilt in the OS that is to use the driver and created.

The protocol processing unit 74 performs protocol processing on the L2 (data link layer)/L3 (network layer)/L4 (transport layer), which are defined by an open systems interconnection (OSI) reference model.

The socket 75 is an interface for the kernel 71 to perform inter-process communication. The socket 75 has a socket buffer so as to suppress frequent data copy processing. The flow until communication establishment via the socket 75 is as follows. 1) The server creates a socket file for accepting clients. 2) A name is given to the reception socket file. 3) A socket queue is created. 4) The first one of connections from the clients accumulated in the socket queue is accepted. 5) The client creates a socket file. 6) The client issues a connection request to the server. 7) The server creates a connection socket file separately from the reception socket file. As a result of communication establishment, the packet processing APL 1 can call up a system call such as read ( ) or write ( ) through the kernel 71.

In the above configuration, the kernel 71 receives a packet arrival notification from the NIC 11 through a hardware interrupt (hardIRQ), and schedules a software interrupt (softIRQ) for packet processing.

Once a packet arrives, the New API (NAPI) implemented in Linux kernel 2.5/2.6 or later performs packet processing through the software interrupt (softIRQ) after the hardware interrupt (hardIRQ). As illustrated in FIG. 13, in the packet transfer using an interrupt model, a packet is transferred through the interrupt processing (see the reference sign "a" in FIG. 13). Therefore, queuing for the interrupt processing occurs, and the packet transfer latency increases.

An overview of NAPI Rx-side packet processing is described below.

[Configuration of Rx-Side Packet Processing by New API (NAPI)]

FIG. 14 is a diagram for explaining an overview of Rx-side packet processing by the New API (NAPI) at the portion surrounded by a dashed line in FIG. 13.

<Device Driver>

As illustrated in FIG. 14, the device driver includes the NIC 11 (physical NIC) which is a network interface card, a hardIRQ 81 which is a handler to be called up upon an issuance of a processing request of the NIC 11 to perform the requested processing (hardware interrupt), and netif_rx 82 which is a software interrupt processing functional unit.

<Networking Layer>

There are arranged in a networking layer, softIRQ 83, which is a handler to be called up upon the issuance of a processing request of the netif_rx 82 to perform the requested processing (software interrupt); and do_softirq 84, which is a control functional unit that performs the software interrupt (softIRQ), as well as net_rx_action 85, which is a packet processing functional unit that receives and performs a software interrupt (softIRQ); poll_list 86, which registers information about a net device (net_device) indicating which device the hardware interrupt from the NIC 11 comes from; netif_receive_skb 87, which creates an sk_buff structure (a structure for making the kernel 71 perceive the state of a packet); and the ring buffer 72.

<Protocol Layer>

There are arranged in a protocol layer, ip_rcv 88, arp_rcv 89, and the like, which are packet processing functional units.

The above netif_rx 82, do_softirq 84, net_rx_action 85, netif_receive_skb 87, ip_rcv 88, and arp_rcv 89 are program components (functions) to be used for packet processing in the kernel 71.

[Rx-Side Packet Processing Operation by New API (NAPI)]

Arrows (reference signs) "b" to "m" in FIG. 14 indicate a flow of Rx-side packet processing.

Upon receipt of a packet (or a frame) in a frame from the device on the other side, a hardware functional unit 11a (hereinafter referred to as the NIC 11) of the NIC 11 copies the packet that has arrived at the ring buffer 72 by direct memory access (DMA) transfer (see reference sign "b" in FIG. 14), without using the CPU. This ring buffer 72 is a memory space in the server, and is managed by the kernel 71 (see FIG. 13).

However, the kernel 71 cannot recognize the packet only if the NIC 11 copies the packet that has arrived at the ring buffer 72. Therefore, when a packet arrives, the NIC 11 puts a hardware interrupt (hardIRQ) up to the hardIRQ 81 (see reference sign "c" in FIG. 14), and the netif_rx 82 performs the processing described below, so that the kernel 71 recognizes the packet. Note that the hardIRQ 81 surrounded by an ellipse in FIG. 14 represents a handler, not a functional unit.

The netif_rx 82 has a function of actually performing processing, and, when the hardIRQ 81 (handler) starts (see reference sign "d" in FIG. 14), the netif_rx 82 stores, in the poll_list 86, information regarding the net_device (net_device) indicating which device the hardware interrupt from the NIC 11 comes from, which is one piece of information contained in the hardware interrupt (hardIRQ). Then, the netif_rx 82 registers harvesting of a queue (to refer to content of packets accumulated in a buffer and delete, from the buffer, an entry of a queue corresponding to processing of the packets in consideration of next processing) (see reference sign e in FIG. 14). Specifically, when packets are packed into the ring buffer 72, the netif_rx 82 registers harvesting of a subsequent queue in the poll_list 86 by using a driver of the NIC 11 (see reference sign e in FIG. 14). Thus, queue harvesting information caused by the packets packed into the ring buffer 72 is registered in the poll_list 86.

As described above, in <Device driver> in FIG. 14, upon receipt of a packet, the NIC 11 copies the packet that has arrived at the ring buffer 72 by DMA transfer. The NIC 11 also starts the hardIRQ 81 (handler), and the netif_rx 82 registers net_device in the poll_list 86 and schedules a software interrupt (softIRQ).

By this point, the hardware interrupt processing in <Device driver> in FIG. 14 is stopped.

Thereafter, the netif_rx 82 raises harvesting of data stored in the ring buffer 72 to the softIRQ 83 (handler) through a software interrupt (softIRQ) by using information (specifically, pointers) in queues accumulated in the poll_list 86 (see reference sign f in FIG. 14) and notifies the do_softirq 84 serving as the software interrupt control functional unit of the harvesting of the data (see reference sign g in FIG. 14).

The do_softirq 84 is a software interrupt control functional unit, and defines functions of a software interrupt (there are various kinds of packet processing, and interrupt processing is one of them; interrupt processing is defined herein). On the basis of this definition, the do_softirq 84 notifies the net_rx_action 85, which actually performs the software interrupt processing, of the current (corresponding) software interrupt request (see reference sign h in FIG. 14).

When a turn of the softIRQ comes, the net_rx_action 85 calls a polling routine for removing packets from the ring buffer 72 on the basis of the net_device registered in the poll_list 86 (see reference sign i in FIG. 14) and pulls the packets (see reference sign j in FIG. 14). At this time, the net_rx_action 85 continues the harvesting until the poll_list 86 becomes empty.

Thereafter, the net_rx_action 85 transmits a notification to the netif_receive_skb 87 (see reference sign "k" in FIG. 14).

The netif_receive_skb 87 creates an sk_buff structure, analyzes content of the packets, and passes processing to the protocol processing unit 74 in the later stage (see FIG. 13) for each type. Specifically, the netif_receive_skb 87 analyzes content of the packets. In a case in which processing is performed in accordance with the content of the packets, the processing is passed to the ip_rcv 88 of <Protocol layer> (reference sign "l" in FIG. 14). In a case of L2, for example, the processing is passed to the arp_rcv 89 (reference sign "m" in FIG. 14).

Patent Literature 1 describes a server network delay controller (KBP: kernel busy poll). The KBP constantly monitors packet arrival by a polling model in the kernel. Thus, softIRQ is reduced, and low-latency packet processing is achieved.

CITATION LIST

Patent Literature

Patent Literature 1: International Application Publication No. WO 2021/130828 A

Non Patent Literature

Non Patent Literature 1: New API (NAPI), [online], [Searched on Jan. 11, 2022], the Internet <URL: http://lwn.net/2002/0321/a/napi-howto.php3>

SUMMARY OF INVENTION

Technical Problem

However, the packet transfer by either an interrupt model or the polling model has the following problems.

The interrupt model performs packet transfer through software interrupt processing for the kernel that has received an event (hardware interrupt) from HW to perform packet processing. Therefore, the interrupt model performs packet transfer through interrupt (software interrupt) processing, and thus conflict with another interrupt occurs, or queueing occurs when an interrupt destination CPU is used for a process having higher priority, which result in a larger latency in packet transfer. In this case, when interrupt processing is congested, a queueing delay becomes even longer.

For example, in packet transfer by an interrupt model, a packet is transferred through interrupt processing. Therefore, queuing for the interrupt processing occurs, and the packet transfer latency increases.

A mechanism in which a delay occurs in an interrupt model is explained in further detail.

In a general kernel, packet transfer processing is transmitted through software interrupt processing after hardware interrupt processing.

When a software interrupt of packet transfer processing occurs, the software interrupt processing cannot be immediately performed under the conditions (1) to (3) listed below. For this reason, the interrupt processing is scheduled through arbitration by a scheduler such as ksoftirqd (kernel thread for each CPU, which is executed when the load of the software interrupt is high), and therefore, ms-order queuing occurs.

(1) In a case of contention with some other hardware interrupt processing
(2) In a case of contention with some other software interrupt processing
(3) In a case of an interrupt destination CPU being occupied by some other process or kernel thread with a high priority level (such as a migration thread).

Under the above conditions, the software interrupt processing cannot be immediately performed.

Also, as for packet processing by a New API (NAPI), a ms-order NW delay occurs due to interrupt processing (softIRQ) contention, as shown in a dashed-line box "n" in FIG. 14.

On the other hand, when the technology described in Patent Literature 1 is used, by constantly monitoring packet arrival, it is possible to suppress software interrupt and achieve low-latency packet harvesting. However, because constant monitoring of packet arrival occupies the CPU core and uses the CPU time, power consumption increases. Specifically, because the kernel thread that constantly monitors packet arrival occupies the CPU core and always uses the CPU time, there is a problem of an increase in power consumption. A relationship between workload and the CPU usage rate is described with reference to FIGS. 15 and 16.

FIG. 15 shows an example of video (30 FPS) data transfer. The workload illustrated in FIG. 15 is to intermittently perform data transfer every 30 ms at a transfer rate of 350 Mbps.

FIG. 16 is a diagram illustrating the CPU usage rate used by a busy poll thread in the KBP disclosed in Patent Literature 1.

As illustrated in FIG. 16, in the KBP, the kernel thread occupies the CPU core to perform busy polling. Even in the intermittent packet reception illustrated in FIG. 15, the CPU is always used in the KBP, regardless of whether a packet arrives or not. Therefore, there is the problem of an increase in power consumption.

The present invention has been made in view of such a background, and it is an object of the present invention to perform packet transfer with a shorter delay in the server while suppressing an excessive occurrence of HW interrupt due to sleep of a polling thread and reducing power consumption.

Solution to Problem

In order to solve the above problem, the present invention provides a server delay controller that is arranged in a kernel space of an OS and starts a thread that monitors a packet arrival using the polling model, the server delay controller including: a packet arrival monitoring unit that monitors a poll list that registers network device information indicating which device a hardware interrupt from an interface unit comes from; a packet harvesting unit that refers to a packet held in a ring buffer and performs harvesting of deleting an entry of a corresponding queue from the ring buffer on a basis of processing to be performed next in a case in which a packet has arrived; a sleep management unit that makes the thread sleep in a case in which no packet arrives for a predetermined period, and cancels the sleep of the thread with a hardware interrupt when the packet arrives; a HW interrupt frequency storage unit that stores the number of times of hardware interrupt; and a HW interrupt frequency control unit that calculates a HW interrupt frequency on the basis of the number of times of hardware interrupt, and controls HW interrupt permission or prohibition by sleep of the sleep management unit on the basis of the calculated HW interrupt frequency.

Advantageous Effects of Invention

According to the present invention, it is possible to perform packet transfer with a shorter delay in the server while suppressing excessive o occurrences of HW interrupt due to sleep of a polling thread and reducing power consumption.

DESCRIPTION OF EMBODIMENTS

The following is a description of a server delay control system and the like according to a mode for carrying out the present invention (the mode is hereinafter referred to as "this embodiment"), with reference to the drawings.
[Overview]

Figure 1:
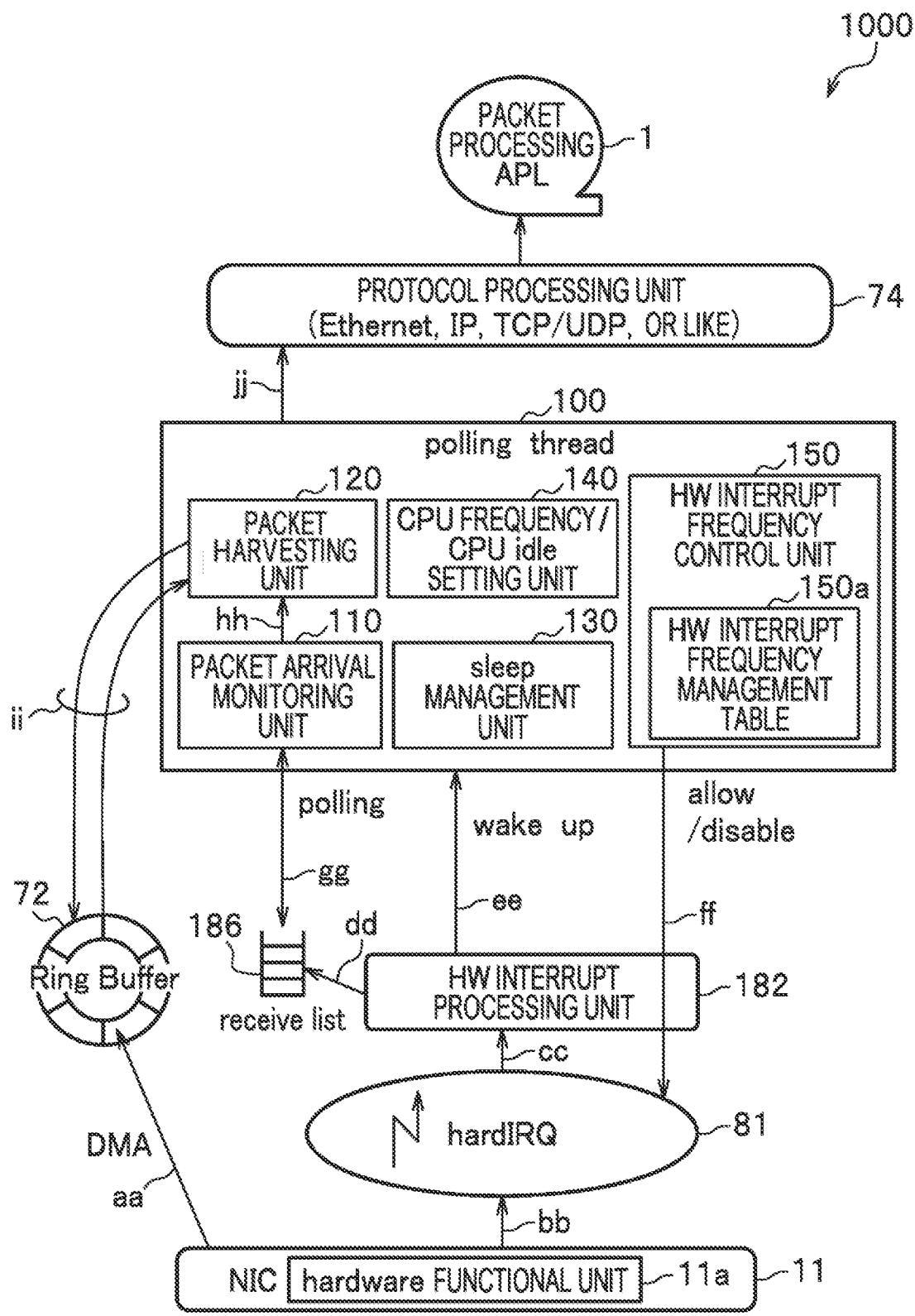
FIG. 1 is a schematic configuration diagram of a server delay control system according to an embodiment of the present invention.
Figure 13:
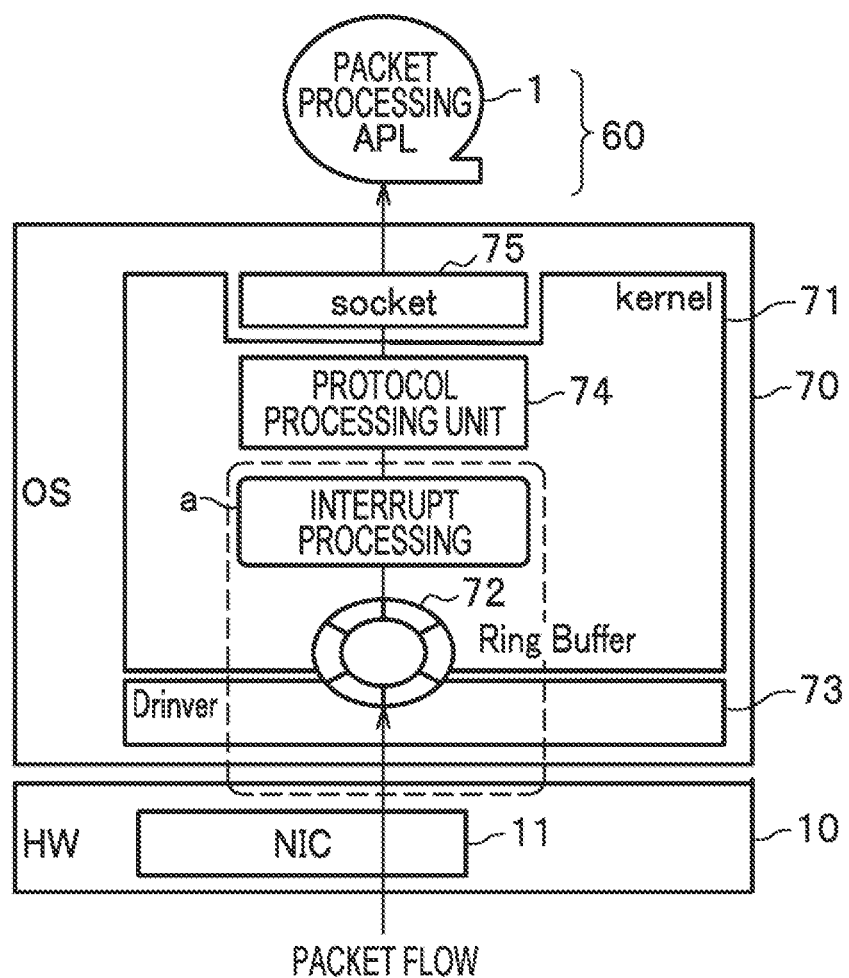
FIG. 13 is a schematic diagram of Rx-side packet processing by a New API (NAPI) implemented by Linux kernel 2.5/2.6 or later.

FIG. 1 is a schematic configuration diagram of a server delay control system according to an embodiment of the present invention. This embodiment is an example in which the present invention is applied to Rx-side packet processing by a New API (NAPI) implemented by Linux kernel 2.5/2.6 or later. The same components are denoted by the same reference signs as those in FIG. 13.

As illustrated in FIG. 1, a server delay control system 1000 executes a packet processing APL 1 arranged in a user space that can be used by a user in a server including an OS (a host OS, for example), and performs packet transfer between a NIC 11 of a HW connected to the OS and the packet processing APL 1.

The server delay control system 1000 includes the NIC 11 (physical NIC) which is a network interface card, a hardIRQ 81 which is a handler to be called up upon issuance of a processing request for the NIC 11 to perform requested processing (hardware interrupt), a HW interrupt processing unit 182 which is a processing functional unit of HW interrupt, a receive list 186, a ring buffer 72, a polling thread (server delay controller 100), and a protocol processing unit 74.

The ring buffer 72 is managed by a kernel in a memory space in the server. The ring buffer 72 is a buffer of a predetermined size that stores messages output from the kernel as a log, and is overwritten starting from the head when its upper limit size is exceeded.

The protocol processing unit 74 is Ethernet, IP, TCP/UDP, or the like. The protocol processing unit 74 performs protocol processing of L2/L3/L4 defined by the OSI reference model, for example.

<Server Delay Control Device>

The server delay controller 100 is a polling thread arranged in either a kernel space or a user space.

The server delay controller 100 includes a packet arrival monitoring unit 110, a packet harvesting unit 120, a sleep management unit 130, a CPU frequency/CPU idle setting unit 140, and a HW interrupt frequency control unit 150 having a HW interrupt frequency management table 150*a* (HW interrupt frequency storage unit).

The packet arrival monitoring unit 110 is a thread for monitoring whether a packet has arrived. The packet arrival monitoring unit 110 monitors (polls) the receive list 186.

The packet arrival monitoring unit 110 acquires from the receive list 186, pointer information whose packet exists in the ring buffer 72, and net_device information, and transmits the information (the pointer information and the net_device information) to the packet harvesting unit 120. In a case in which a plurality of pieces of packet information exists in the receive list 186, the plurality of pieces of information is transmitted.

In a case in which a packet has arrived, the packet harvesting unit 120 refers to the packets held in the ring buffer 72, and performs harvesting to delete the entry of the corresponding queue from the ring buffer 72, on the basis of the processing to be performed next (hereinafter, this processing is also referred to simply as harvesting packets from the ring buffer 72 in some cases). The packet harvesting unit 120 retrieves a packet from the ring buffer 72 on the basis of the received information, and transfers the packet to the protocol processing unit 74.

When a plurality of packets is accumulated in the ring buffer 72, the packet harvesting unit 120 collectively harvests the plurality of packets and passes the packets to the subsequent protocol processing unit 74. Note that the number of packets harvested at a time is called quota, and is also often called batch processing. The protocol processing unit 74 also performs protocol processing collectively on a plurality of packets, and thus the processing is performed at high speed.

The sleep management unit 130 makes the thread (polling thread) sleep in a case in which any packet does not arrive over a predetermined period, and cancels the sleep with a hardware interrupt (hardIRQ) of the thread (polling thread) when the packet arrives (described below in detail).

During sleep, the CPU frequency/CPU idle setting unit 140 sets the CPU operation frequency of the CPU core used by the thread (polling thread) to a low frequency. During sleep, the CPU frequency/CPU idle setting unit 140 sets the CPU idle state of the CPU core used by this thread (polling thread) to a power-saving mode (described below in detail).

The HW interrupt frequency control unit 150 calculates a HW interrupt frequency on the basis of the number of times of HW interrupt, and controls permission or prohibition of HW interrupt by sleep of the sleep management unit 130 on the basis of the calculated HW interrupt frequency. Specifically, the HW interrupt frequency control unit 150 compares the calculated HW interrupt frequency with a predetermined threshold, and does not cause the sleep management unit 130 to execute sleep for a certain time when the HW interrupt frequency is smaller than the predetermined threshold (described below in detail).

The HW interrupt frequency management table 150a stores, as the HW interrupt frequency, a time stamp at which the HW interrupt has occurred (a time stamp indicating when the HW interrupt has occurred). The HW interrupt frequency control unit 150 calculates the HW interrupt frequency on the basis of the number of time stamps stored in the HW interrupt frequency management table 150a.

<Arrangement of Server Delay Control Device>

Figure 2:
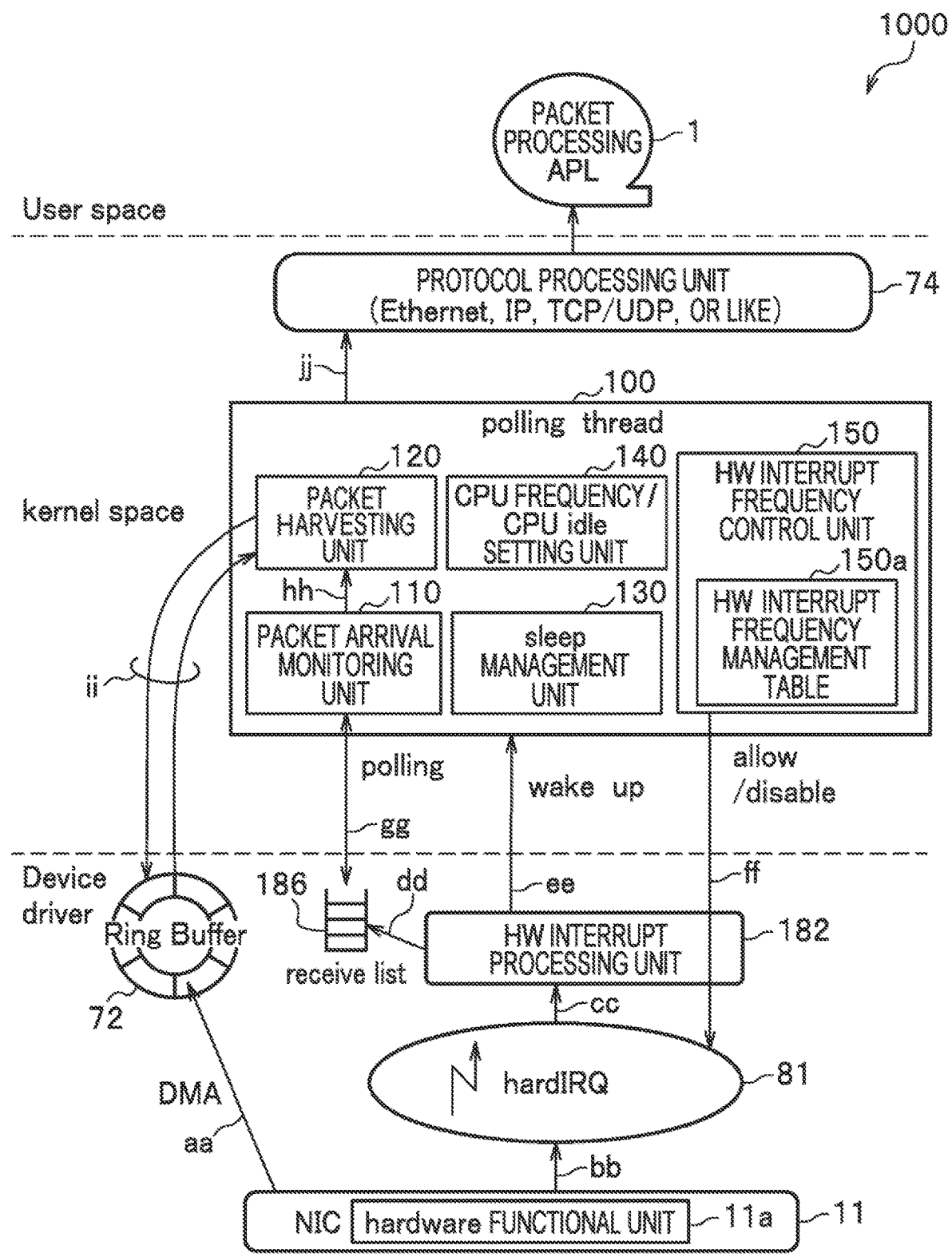
FIG. 2 is a configuration example in which a polling thread (server delay controller) of FIG. 1 is arranged in a kernel space.
Figure 3:
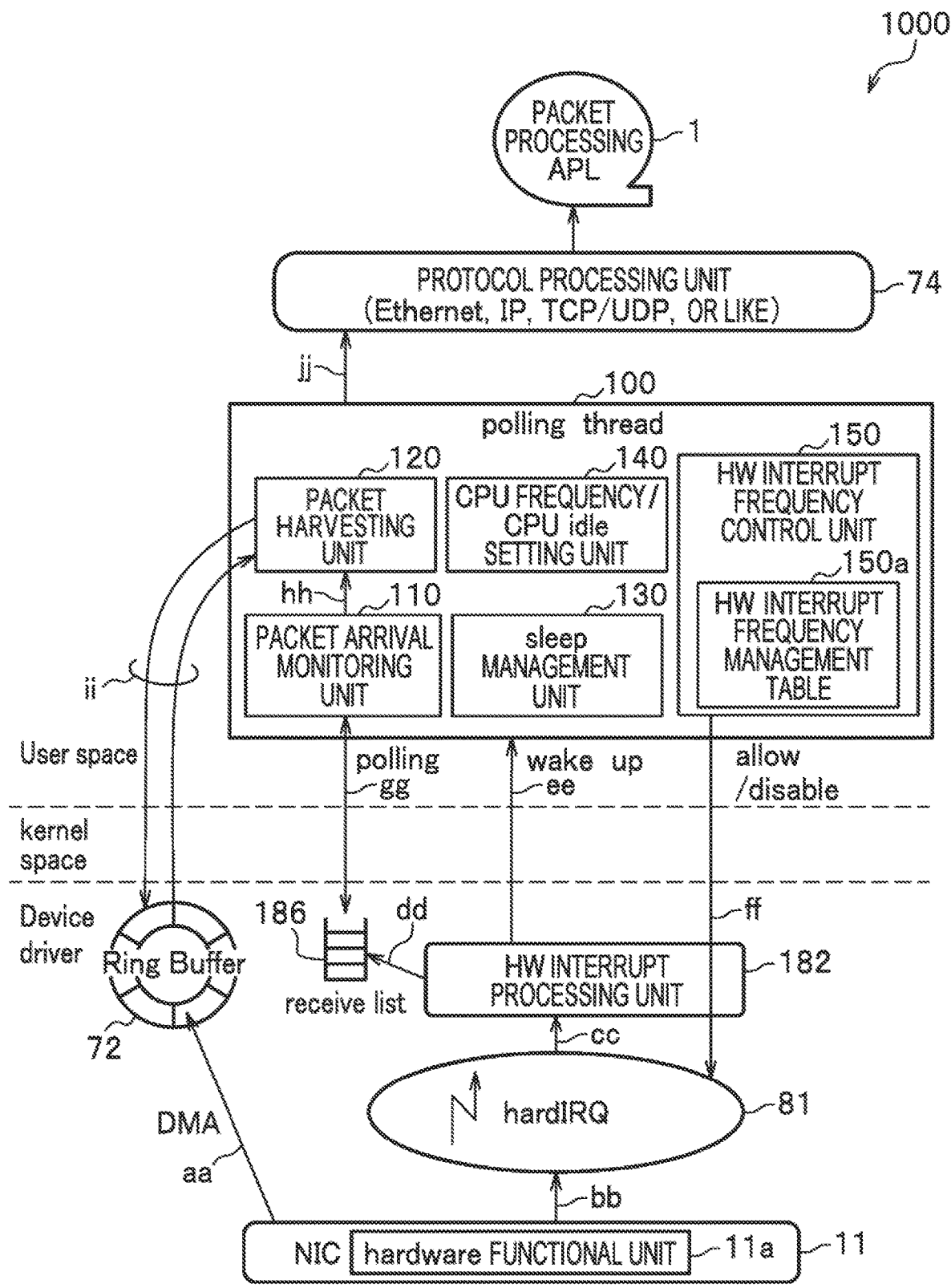
FIG. 3 is a configuration example in which the polling thread (server delay controller) of FIG. 1 is arranged in a user space.

FIGS. 2 and 3 are diagrams for explaining an arrangement of the polling thread (server delay controller 100) in FIG. 1.

Arrangement of Polling Thread in Kernel Space

FIG. 2 is a configuration example in which the polling thread (server delay controller 100) of FIG. 1 is arranged in a kernel space.

In the server delay control system 1000 illustrated in FIG. 2, the polling thread (server delay controller 100) and the protocol processing unit 74 are arranged in the kernel space. This polling thread (server delay controller 100) operates in the kernel space. The server delay control system 1000 executes the packet processing APL 1 arranged in the user space in the server including the OS, and performs packet transfer between the NIC 11 of the HW and the packet processing APL1 via the device driver connected to the OS.

Note that as illustrated in FIG. 2, the hardIRQ 81, the HW interrupt processing unit 182, the receive list 186, and the ring buffer 72 are arranged in the device driver.

The device driver is a driver for monitoring hardware.

The present invention can be applied to a case in which there is a polling thread inside the kernel, such as NAPI or KBP.

Arrangement of Polling Thread in User Space.

FIG. 3 is a configuration example in which the polling thread (server delay controller 100) of FIG. 1 is arranged in a user space.

In the server delay control system 1000 illustrated in FIG. 3, the polling thread (server delay controller 100) and the protocol processing unit 74 are arranged in the user space. This polling thread (server delay controller 100) operates not in the kernel space but in the user space.

In the server delay control system 1000 illustrated in FIG. 3, the polling thread (server delay controller 100) performs packet transfer between the device driver and NIC 11 and the packet processing APL 1 while bypassing the kernel space.

The present invention can be applied to a case in which there is a polling thread in a user space, such as a DPDK.

In the description below, an operation of the server delay control system 1000 is explained.

[Rx-Side Packet Processing Operation According to Present Invention]

Arrows (reference signs) "aa" to "jj" in FIGS. 1 to 3 indicate the flow of Rx-side packet processing.

Upon receipt of a packet (or a frame) in a frame from the device on the other side, the NIC 11 copies the packet that has arrived at the ring buffer 72 by DMA transfer (see reference sign "aa"" in FIGS. 1 to 3), without using the CPU. The ring buffer 72 is managed by <Device driver>.

When a packet arrives, the NIC 11 puts a hardware interrupt (hardIRQ) into the hardIRQ 81 (handler) (see reference sign "bb" in FIGS. 1 to 3), and the HW interrupt processing unit 182 performs the processing described below to recognize the packet.

When the hardwire 81 (handler) starts (see reference sign "cc" in FIGS. 1 to 3), the HW interrupt processing unit 182 stores, into the receive list 186, net device information (net device) indicating which device the hardware interrupt from the NIC 11 comes from, which is one piece of information contained in the hardware interrupt (hardIRQ), and registers queue harvesting information. Specifically, when packets are packed into the ring buffer 72, the HW interrupt processing unit 182 registers harvesting of a subsequent queue in the receive list 186 by using a driver of the NIC 11 (see reference sign "dd" in FIGS. 1 to 3). Thus, the queue harvesting due to the packets packed into the ring buffer 72 is registered in the receive list 186.

Figure 14:
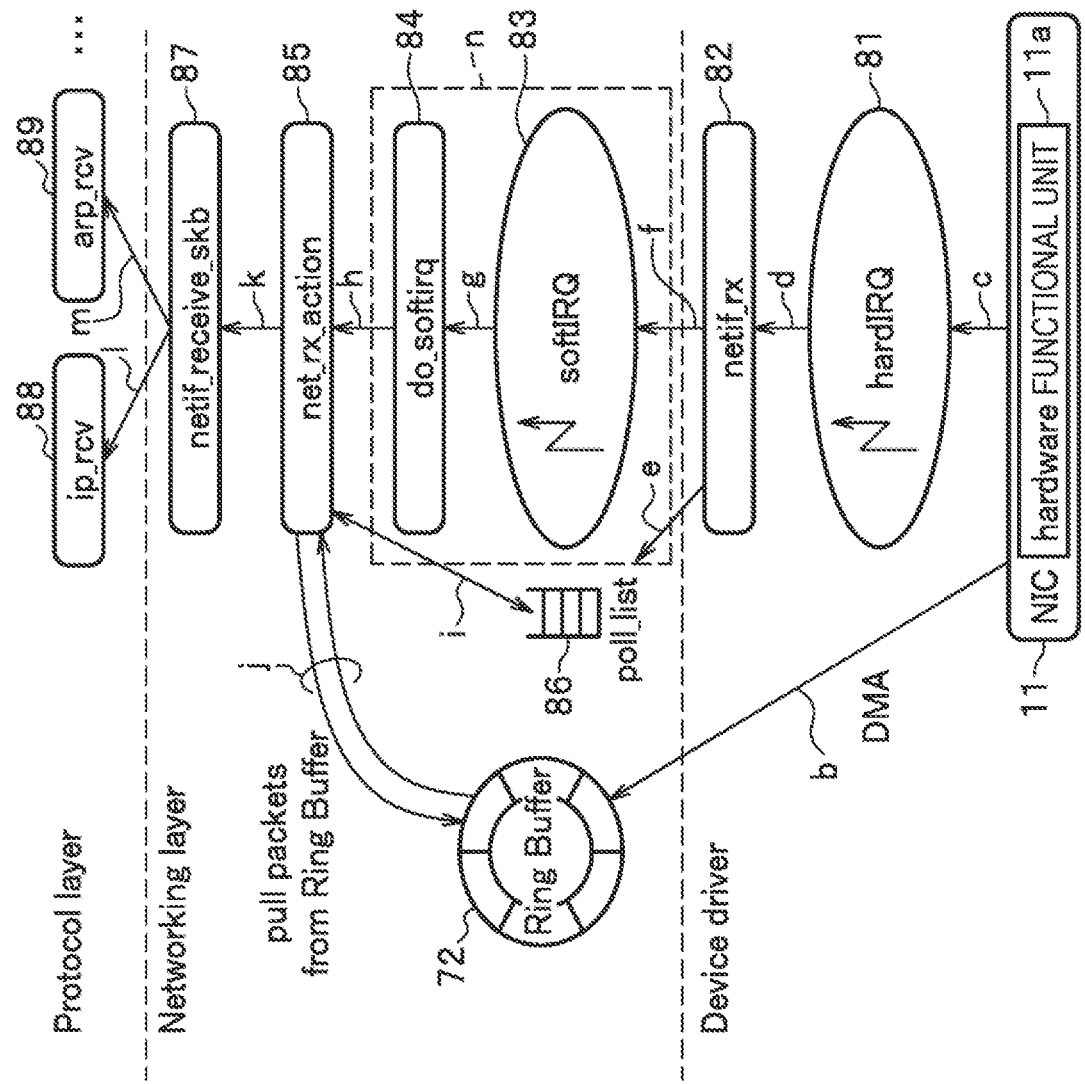
FIG. 14 is a diagram illustrating an overview of the Rx-side packet processing by the New API (NAPI) for a portion surrounded by a broken line in FIG. 13.

The HW interrupt processing unit 182 registers net device in the receive list 186, but, unlike the netif_rx 82 in FIG. 14, does not schedule a software interrupt (softIRQ). That is, the HW interrupt processing unit 182 differs from the netif_rx 82 in FIG. 14 in that it does not schedule a software interrupt (softIRQ).

The HW interrupt processing unit 182 also cancels the sleep to awake the polling thread in a sleep state (see reference sign "ee" in FIGS. 1 to 3).

By this point, the hardware interrupt processing in <Device driver> in FIGS. 1 to 3 is stopped.

In this embodiment, in <Networking layer> illustrated in FIG. 14, the softIRQ 83 and the do_softirq 84 are excluded, and accordingly, the netif_rx 82 illustrated in FIG. 14 does not send a notification of a start of the softIRQ 83 (handler) (see reference sign "f" in FIG. 14).

In this embodiment, the server delay control system 1000 excludes the softIRQ 83 and the do_softirq 84 illustrated in FIG. 14, and instead, includes the polling thread (server delay controller 100) in <kernel space> (see FIG. 2). Alternatively, the server delay control system 1000 includes the polling thread (server delay controller 100) in <User space> (see FIG. 3).

In <kernel space> illustrated in FIG. 2 or <User space> illustrated in FIG. 3, the HW interrupt frequency control unit 150 of the server delay controller 100 manages the HW interrupt frequency and controls sleep and HW interrupt permission/prohibition of the polling thread according to the HW interrupt frequency (see reference sign "ff" in FIGS. 1 to 3).

The packet arrival monitoring unit 110 monitors (performs polling on) the receive list 186 (see reference sign "gg" in FIGS. 1 to 3), and checks whether there is a packet arrival.

The packet arrival monitoring unit 110 acquires from the receive list 186, pointer information whose packet exists in the ring buffer 72, and net_device information, and transmits the information (the pointer information and the net_device information) to the packet harvesting unit 120 (see reference sign "hh" in FIGS. 1 to 3). In a case in which a plurality of pieces of packet information exist in the receive list 186, the plurality of pieces of information is transmitted.

In a case in which a packet has arrived, the packet harvesting unit 120 of the server delay controller 100 harvests the packet from the ring buffer 72 (see reference sign "ii" in FIGS. 1 to 3).

The packet harvesting unit 120 retrieves a packet from the ring buffer 72 on the basis of the received information, and transfers the packet to the protocol processing unit 74 (see reference sign "jj" in FIGS. 1 to 3).

[Sleep Operation of Polling Thread]

The server delay control system 1000 stops the softIRQ of packet processing, which is a main cause of a NW delay, and executes the polling thread so that the packet arrival monitoring unit 110 of the server delay controller 100 monitors packet arrival. The packet harvesting unit 120 then performs packet processing with a polling model (without softIRQ) at the time of a packet arrival.

At the time of a packet arrival, a hardware interrupt handler awakes the polling thread, so that softIRQ contention can be avoided, and packet transfer processing can be immediately performed. In other words, the packet arrival monitoring function is made to stand by, and is awoken by a hardware interrupt, so that the latency can be made lower than that in packet transfer processing through a software interrupt caused by a NAPI or the like.

The polling thread (server delay controller 100) that monitors packet arrival can sleep while there is no packet arrival.

The polling thread (server delay controller 100) sleeps in accordance with the presence/absence of a packet arrival, and cancels the sleep with the hardIRQ 81 at the time of a packet arrival. Specifically, the sleep management unit 130 of the server delay controller 100 makes the polling thread sleep in accordance with the presence/absence of a packet arrival, or when there is no packet arrival over a predetermined period. The sleep management unit 130 cancels the sleep with the hardIRQ 81 at the time of a packet arrival. As a result, a softIRQ contention is avoided, and lower latency is achieved.

The CPU frequency/CPU idle setting unit 140 of the server delay controller 100 changes the CPU operation frequency and the idle setting, in accordance with the presence/absence of a packet arrival. Specifically, the CPU frequency/CPU idle setting unit 140 lowers the CPU frequency during sleep, and raises the CPU frequency at the time of restart (returns the CPU operation frequency to its original frequency). The CPU frequency/CPU idle setting unit 140 also changes the CPU idle setting to power saving during sleep. Power saving is also achieved by changing the CPU operation frequency to a lower frequency during sleep, or changing the CPU idle setting to power saving.

Figure 4:
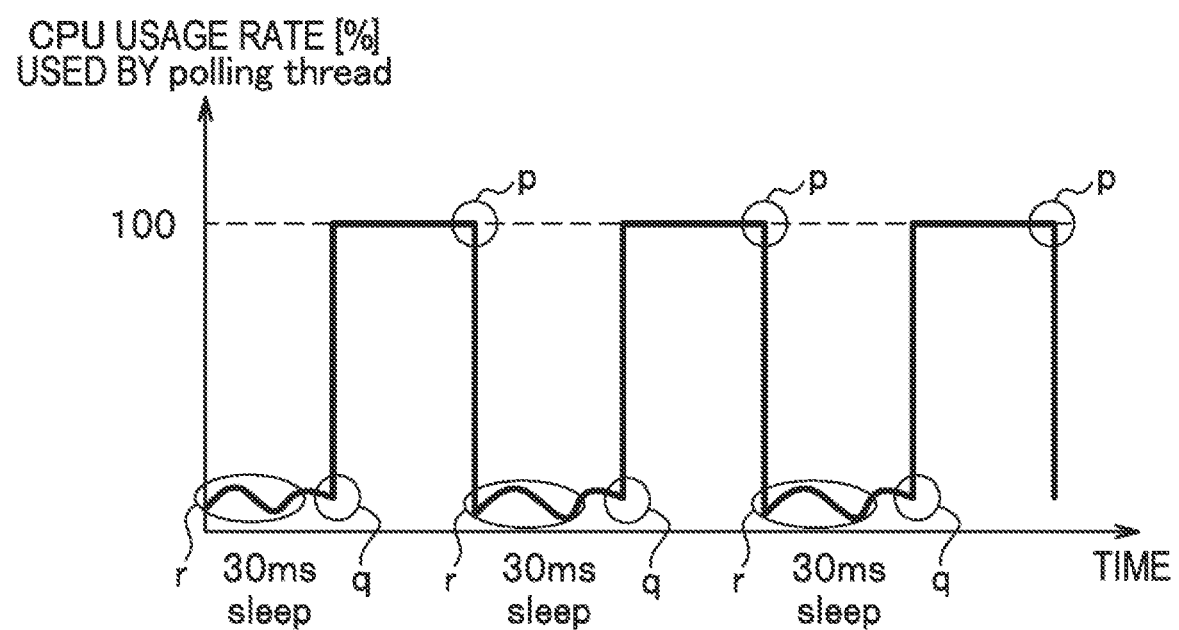
FIG. 4 is a diagram illustrating an example operation of the polling thread of the server delay controller of the server delay control system according to the embodiment of the present invention.
Figure 15:
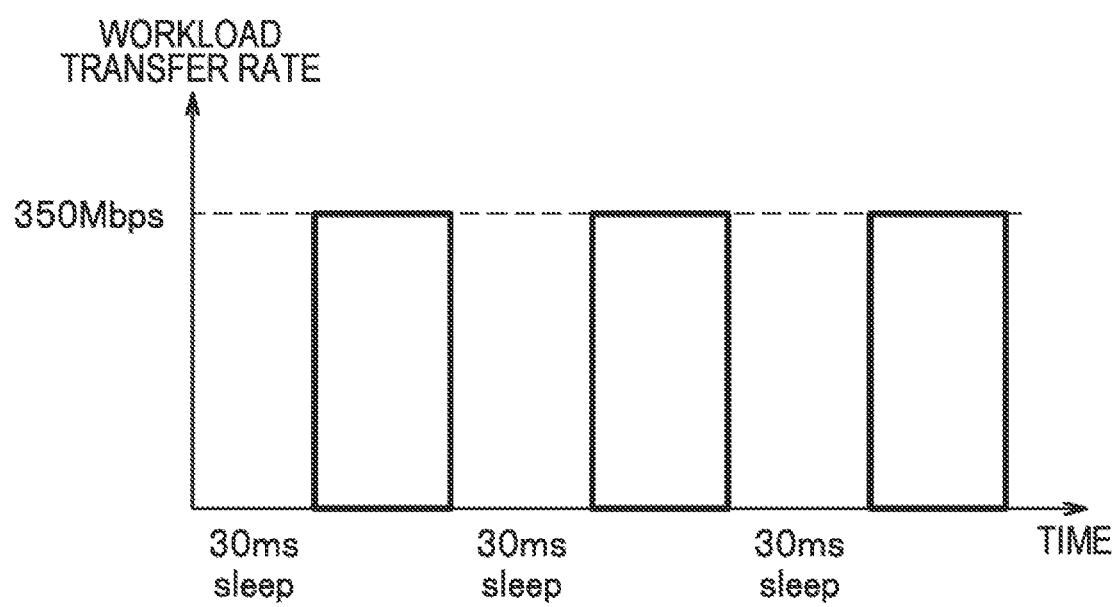
FIG. 15 shows an example of video (30 FPS) data transfer.
Figure 16:
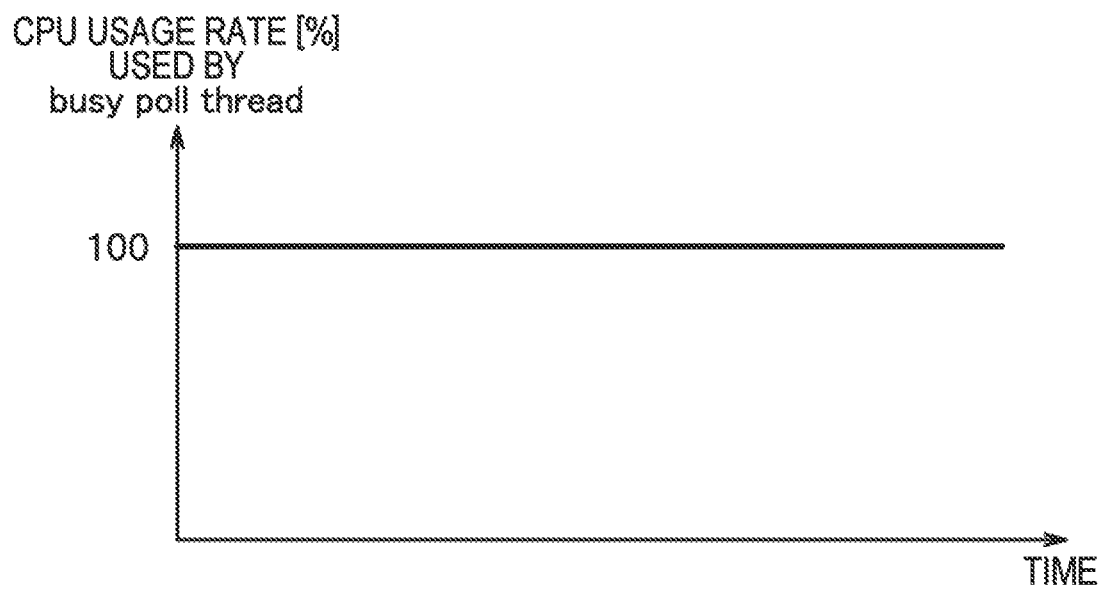
FIG. 16 is a diagram illustrating a CPU usage rate used by a busy poll thread in the KBP disclosed in Patent Literature 1.

FIG. 4 is a diagram illustrating an example operation of the polling thread of the server delay controller 100. The ordinate axis indicates the CPU usage rate [%] of the CPU core used by the polling thread, and the abscissa axis indicates time. Note that FIG. 4 illustrates an example polling thread operation depending on packet arrival corresponding to the example of transfer of the video (30 FPS) data whose packets are to be intermittently received as illustrated in FIG. 15.

As illustrated in FIG. 4, the sleep management unit 130 of the server delay controller 100 makes the polling thread sleep (see reference sign "p" in FIG. 4) in a case in which there is no packet arrival over a predetermined period (more specifically, in a case in which there is no next packet arrival even after a fixed value (a certain period) determined beforehand by the maintenance personnel/operator has elapsed since the arrival of a certain packet). The sleep management unit 130 then activates the polling thread with the hardIRQ 81 when a packet arrives (see reference sign q in FIG. 4).

Note that, during sleep, the kernel thread does not occupy the CPU core, and therefore, the CPU usage rate of the CPU core to be used by the polling thread might fluctuate (see reference sign r in FIG. 4) when a timer interrupt for stabilizing the system operation enters the corresponding CPU core, or when a migration thread for performing error processing or the like might enter the corresponding CPU core, other than when the polling thread uses the CPU core.

[Relationship Between Packet Arrival Speed and Packet Reception Speed]

As described above, when there is an unreceived packet in the ring buffer 72, the polling thread (server delay controller 100) prohibits the hardware interrupt request (hardIRQ) and performs packet reception by polling.

Here, when a predetermined condition such as equivalence of the packet arrival speed and the packet reception speed is satisfied, the number of times of hardIRQ due to packet arrival increases, and the packet transfer delay time and power consumption may increase due to hardIRQ overhead. Next, hardIRQ overhead is described. The hardware interrupt is extremely high-priority processing, and the interrupted process needs to interrupt the processing and save the intermediate processing to the memory. When the number of times of hardIRQ increases, packet reception processing (protocol processing or the like) is interrupted because CPU time is taken by hardIRQ. Hence, packet reception processing efficiency decreases. A relationship between the packet arrival speed and the packet reception speed is described below.

Figure 5:
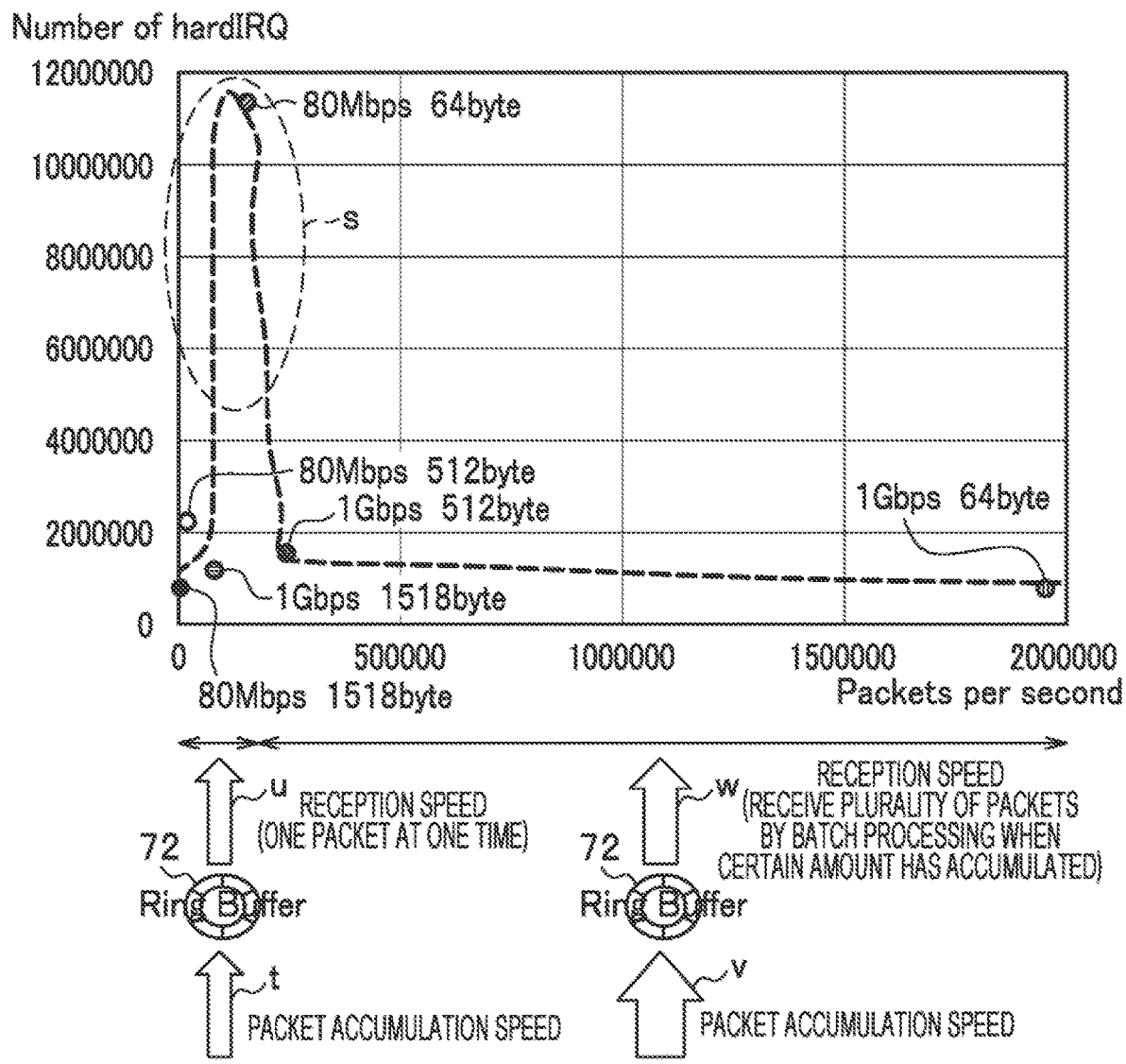
FIG. 5 is a graph illustrating a relationship between a packet arrival speed and the number of hardIRQs of the server delay control system according to the embodiment of the present invention.

FIG. 5 is a graph illustrating a relationship between the packet arrival speed (packets per second) indicating the amount of packets arriving in one second and the number of hardIRQ.

"Sparse" case in which packet arrival frequency is low (see short bidirectional arrow illustrated in the middle part of FIG. 5)

As illustrated in the left of the lower diagram in FIG. 5, in a case in which the speed at which packets accumulate in the ring buffer 72 (see outlined arrow "t" in FIG. 5) and the speed at which packets are received one by one from the ring buffer 72 (see outlined arrow u in FIG. 5) are equal (almost equivalent), because the packet arrival frequency is low, packets do not accumulate in the ring buffer 72, and the hardIRQ is activated every time a packet arrives.

"Dense" case in which packet arrival frequency is high (see long bidirectional arrow illustrated in the middle part of FIG. 5)

As illustrated in the right of the lower diagram in FIG. 5, in a case in which the speed at which packets accumulate in the ring buffer 72 (see outlined arrow "v" in FIG. 5) is high and the speed at which a plurality of packets are received from the ring buffer 72 in batch processing when a certain amount of packets have accumulated (see outlined arrow "w" in FIG. 5) is low, the packet arrival frequency is high and packets accumulate in the ring buffer 72. Hence, the hardIRQ prohibition time is long and the number of hardIRQs is small.

As indicated by the elliptical closed dashed line "s" in the upper diagram of FIG. 5, when the packet arrival speed and the packet reception speed satisfy a predetermined condition, the number of hardIRQs increases, and the delay time and power consumption increase. A case in which the packet arrival speed and the packet reception speed satisfy the predetermined condition is a case in which the speed at which packets accumulate and the speed at which packets are received are equal illustrated on the left of the lower diagram of FIG. 5. Because the packet arrival frequency is low, packets do not accumulate in the ring buffer 72, and hardIRQ is activated every time a packet arrives, whereby delay time and power consumption are increased.

[Supplementary Description of Packet Arrival Frequency]

The packet arrival frequency is explained in further detail. In a state where the packet arrival frequency is low, there are many chances to sleep, and a power saving effect can be expected.

However, in a case in which the packet arrival frequency is moderately low but hardware interrupt occurs every time, so that sleep and wake-up are repeated, hardIRQ is activated every time the packet arrives, and the delay time is increased.

This embodiment provides a technology for suppressing excessive occurrence of HW interrupt due to sleep of a polling thread in a situation where a packet arrival speed and a packet reception speed are almost equal to each other.

[Basic Concept of Operation of Polling Thread (Server Delay Controller 100)]

Figure 6:
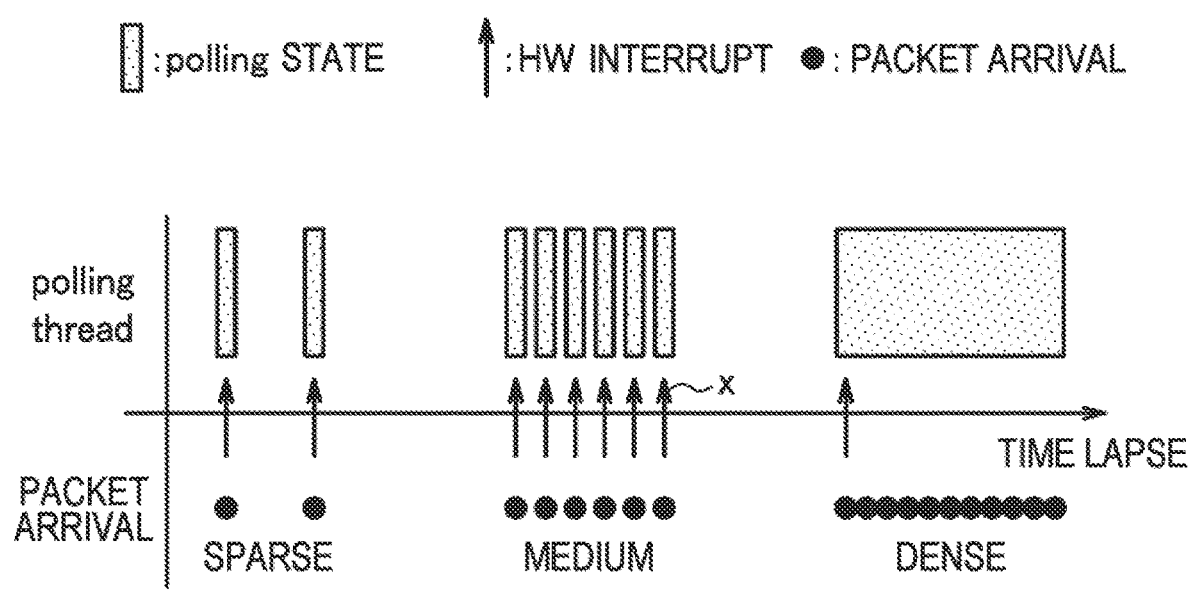
FIG. 6 is a diagram illustrating HW interrupt caused by packet arrival and polling threads started by the HW interrupt in a comparative example.
Figure 7:
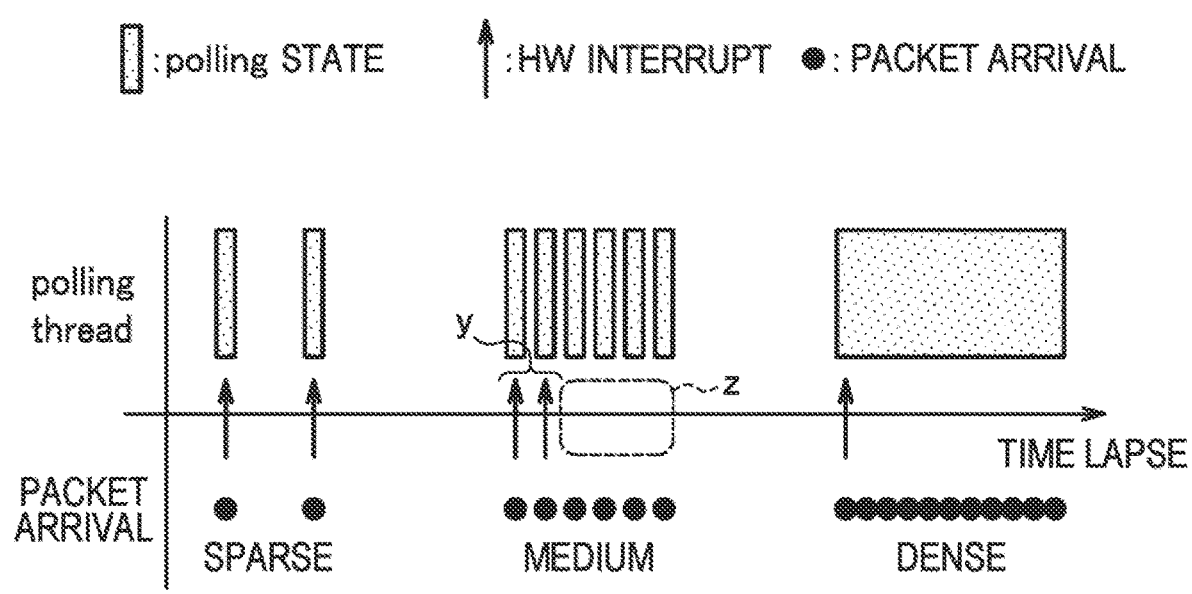
FIG. 7 is a diagram illustrating HW interrupt caused by packet arrival and polling threads started by the HW interrupt.

A basic concept of the polling thread (server delay controller 100) operation is described with reference to FIGS. 6 and 7. FIG. 6 is a diagram illustrating HW interrupt caused by packet arrival and polling threads started by the HW interrupt in a comparative example. FIG. 7 is a diagram illustrating HW interrupt caused by packet arrival and polling threads started by the HW interrupt according to this embodiment. In the drawings, "•" indicates packet arrival, "↑" indicates HW interrupt, and a shaded block indicates a polling state.

In the comparative example of FIG. 6, in a case in which packet arrival is medium, a large number of HW interrupts occur (see reference sign "x" in FIG. 6), and the polling thread enters a polling state due to the large number of HW interrupts occurring. The HW interrupt becomes excessive, and the delay time due to the overhead increases. Note that in a case in which packet arrival is sparse or packet arrival is dense, less HW interrupt is generated, and the delay time due to the overhead is small.

Therefore, in this embodiment, the polling thread (server delay controller 100) calculates a HW interrupt frequency "f" per unit time, and compares the calculated HW interrupt frequency "f" with a threshold set in advance by the operator for evaluation. Then, a logic is introduced to cause the polling thread to sleep and determine whether a subsequent HW interrupt may be allowed. A case in FIG. 7 where packet arrival is medium is taken as an example. As indicated by reference sign "y" in FIG. 7, the polling thread (server delay controller 100) controls interrupt prohibition/permission in accordance with the HW interrupt frequency in consideration of the number of HW interrupts per unit time (see dashed-line box "z" in FIG. 7). As a result, excessive HW interrupt is suppressed, and an event in which HW interrupt becomes excessive and delay time due to the overhead increases is suppressed.

[Operation Flow of Polling Thread (Server Delay Controller 100)]

Figure 8:
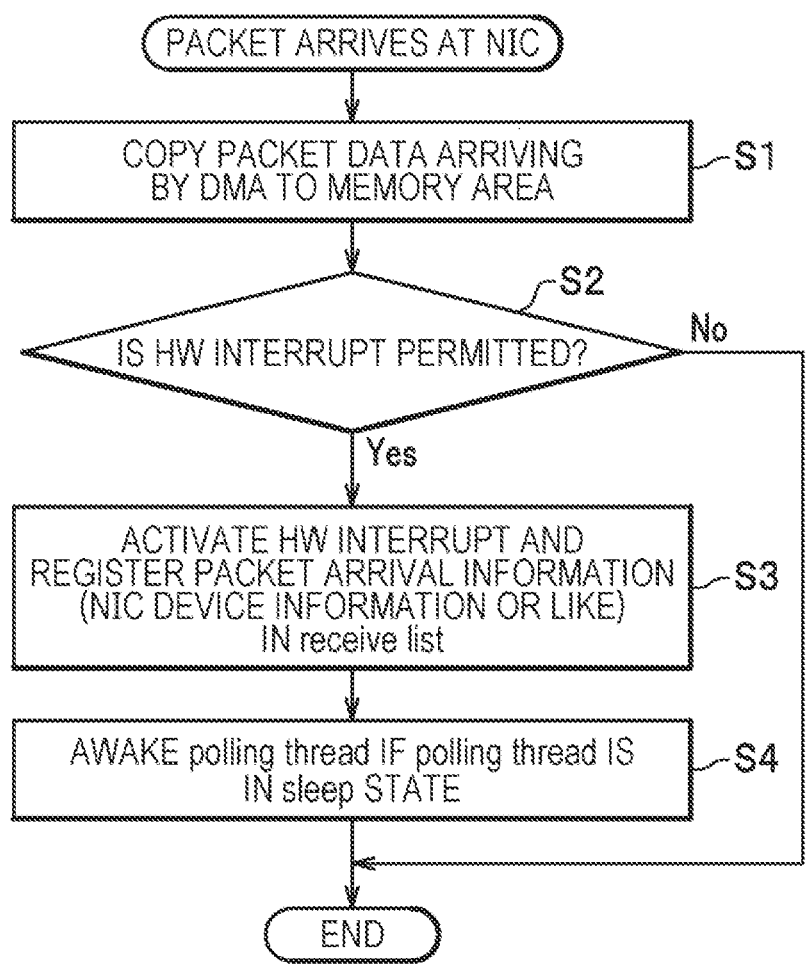
FIG. 8 is a flowchart illustrating NIC and HW interrupt processing of the polling thread (server delay controller) of the server delay control system according to the embodiment of the present invention.

FIG. 8 is a flowchart illustrating NIC and HW interrupt processing of the polling thread (server delay controller 100).

While the polling thread is on, this operation flow is run in a loop.

When a packet arrives at the NIC 11, this flow is started. In step S1, the NIC 11 copies the packet data arriving by direct memory access (DMA) to the memory area.

In step S2, the polling thread (server delay controller 100) determines whether or not HW interrupt is permitted. If the HW interrupt is permitted (S2: Yes), the processing proceeds to step S3, and if the HW interrupt is not permitted (S2: No), the processing of this flow is ended.

In step S3, the NIC 11 activates a HW interrupt by putting a HW interrupt (hardIRQ) into the hardIRQ 81 (handler), and registers packet arrival information (NIC device information or the like) in the receive list 186.

In step S4, if the polling thread (server delay controller 100) is in a sleep state, the NIC 11 awakes the polling thread and ends the processing of this flow.

Figure 9:
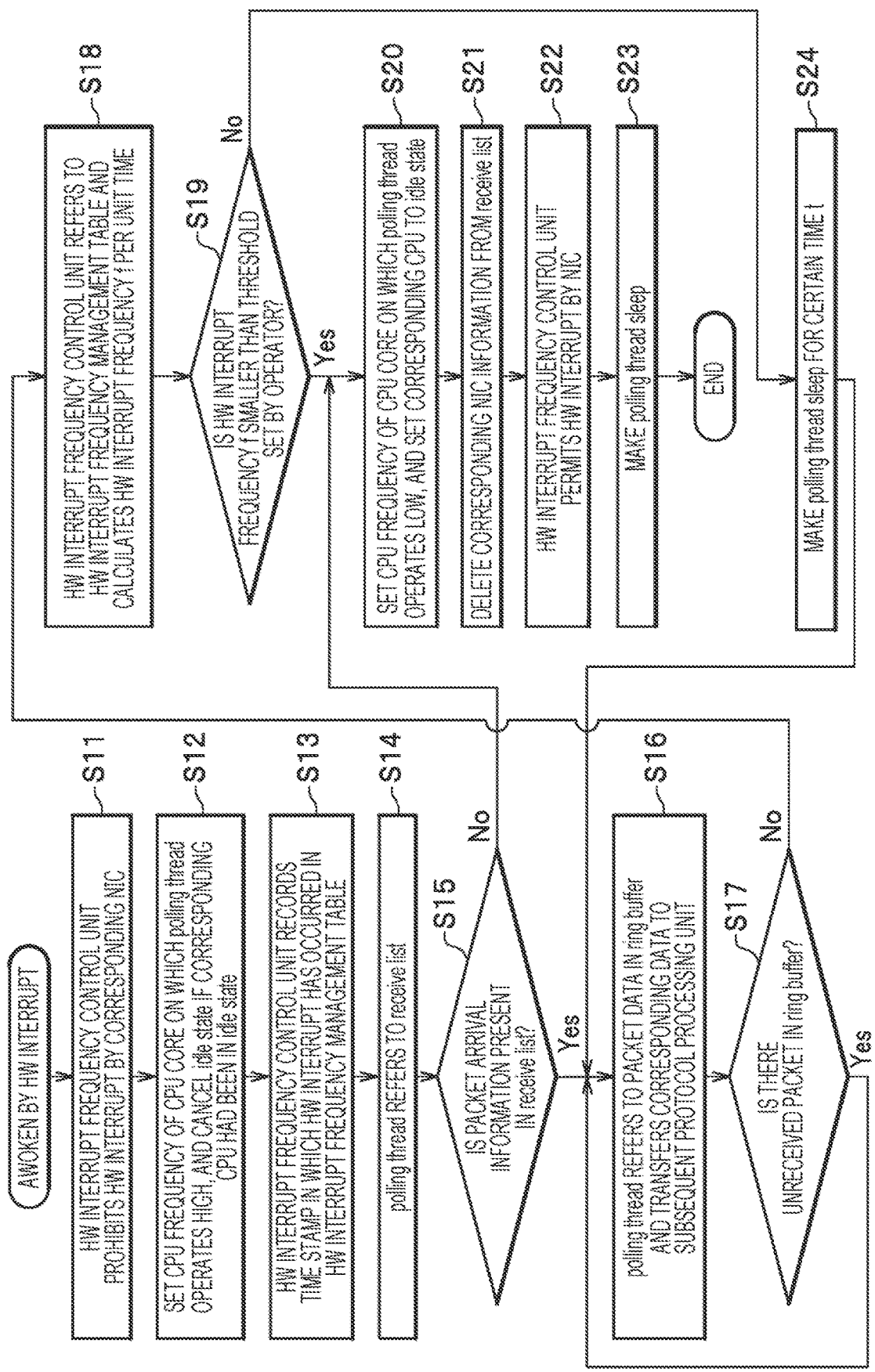
FIG. 9 is a flowchart illustrating HW interrupt frequency control processing of the server delay controller of the server delay control system according to the embodiment of the present invention.

FIG. 9 is a flowchart illustrating HW interrupt frequency control processing of the polling thread (server delay controller 100).

When the polling thread is in a sleep state and a packet arrives, the polling thread is awoken by HW interrupt, and this flow starts.

In step S11, the HW interrupt frequency control unit 150 prohibits HW interrupt by the NIC 11. If the HW interrupt is performed during processing, the processing is interrupted. Therefore, the HW interrupt frequency control unit 150 temporarily prohibits the HW interrupt by the NIC 11.

In step S12, the CPU frequency/CPU idle setting unit 140 sets the CPU frequency of the CPU core on which the polling thread operates to high, and cancels an idle state if the corresponding CPU had been in the idle state.

In step S13, the HW interrupt frequency control unit 150 records the time stamp in which the HW interrupt has occurred in the HW interrupt frequency management table 150a.

In step S14, the polling thread refers to the receive list 186. The polling thread finds out from which device the HW interrupt has occurred and checks the packet arrival information in the receive list 186 in the next step S15.

Note that the presence/absence of the packet arrival may be confirmed by directly referring to the ring buffer 72 instead of referring to the control plane list called the receive list 186. For example, in the NAPI implemented in the Linux kernel, a control plane list called the poll_list is monitored.

In step S15, the packet arrival monitoring unit 110 determines whether packet arrival information is present in the receive list 186. If packet arrival information is not present in the receive list 186 (S15: No), that is, if there is no packet to be processed, the following processing is skipped, and the processing proceeds to step S20.

If the packet arrival information is present in the receive list 186 (S15: Yes), the polling thread refers to packet data in the ring buffer 72 and transfers the corresponding data to the subsequent protocol processing unit 74 in step S16. Here, when there is a plurality of items of data, reception processing may be performed collectively.

In step S17, the packet harvesting unit 120 determines whether there is an unreceived packet in the ring buffer 72. If there is an unreceived packet in the ring buffer 72 (S17: Yes), the processing returns to step S16 described above.

If there is no unreceived packet in the ring buffer 72 (S17: No), in step S18, the HW interrupt frequency control unit 150 refers to the HW interrupt frequency management table 150a and calculates the HW interrupt frequency f per unit time. The HW interrupt frequency management table 150a records a time stamp in which a HW interrupt has occurred. The HW interrupt frequency control unit 150 calculates the HW interrupt frequency "f" per unit time on the basis of the number of time stamps recorded in the HW interrupt frequency management table 150a.

Note that by rotating the polling loop while the HW interrupt is prohibited, the HW interrupt frequency "f" decreases every time the calculation is performed.

In step S19, the HW interrupt frequency control unit 150 determines whether the HW interrupt frequency "f" is smaller than a threshold set by the operator. If the HW interrupt frequency "f" is equal to or greater than the threshold (for example, 2 or more HW interrupts at 50 μs) (S19: No), the processing proceeds to step S24.

Note that the determination based on the HW interrupt frequency "f" may use, instead of a fixed threshold set by the operator, a threshold dynamically determined by "learning according to the characteristics of the inflow traffic.

If the HW interrupt frequency "f" is smaller than the threshold set by the operator (S19: Yes), the processing proceeds to sleep control in step S20 and subsequent steps. A case in which the HW interrupt frequency "f" is smaller than the threshold corresponds to the case illustrated in FIG. 7 where the packet arrival is "sparse".

In step S20, the CPU frequency/CPU idle setting unit 140 sets the CPU frequency of the CPU core on which the polling thread operates to low, and sets the corresponding CPU to an idle state.

In step S21, the packet arrival monitoring unit 110 deletes the corresponding NIC information from the receive list 186.

In step S22, the HW interrupt frequency control unit 150 permits HW interrupt by the corresponding NIC.

In step S23, the sleep management unit 130 makes the polling thread sleep and ends the processing of this flow.

On the other hand, if the HW interrupt frequency "f" is equal to or greater than the threshold in step S19, the processing proceeds to step S24. A case in which the HW interrupt frequency "f" is equal to or greater than the threshold corresponds to the case illustrated in FIG. 7 in which the packet arrival is "medium", and the execution result of step S24 corresponds to interrupt prohibition illustrated in a dashed-line box "z" in FIG. 7.

In step S24, the polling thread is made to sleep for a predetermined time (for example, after a lapse of a certain time t), and the processing proceeds to step S16.

Making the polling thread sleep for a certain time "t" mentioned above is described. As described in the case in FIG. 7 where the packet arrival is "medium", when the HW interrupt frequency "f" is equal to or greater than the threshold, even if the polling thread sleeps, the packet arrives immediately and the polling thread is awoken by the HW interrupt. That is, if the polling thread had not been in the sleep state, an event in which the polling thread is not awoken by HW interrupt occurs and excessive HW interrupt is generated. Therefore, in this embodiment, when the HW interrupt frequency "f" is equal to or greater than the threshold, the polling thread is made to sleep after the certain time "t" has elapsed. In other words, even when an original condition for making the polling thread sleep is satisfied, if the HW interrupt frequency "f" is equal to or greater than the threshold, the sleep state is not set for a while (the polling thread is made to sleep after waiting for a lapse of the certain time "t"). As a result, when the packet arrival speed and the packet reception speed satisfy a certain condition (when the speed at which packets accumulate in the ring buffer 72 is equal to the speed at which packets are received) as in the case illustrated in FIG. 7 where the packet arrival is "medium", excessive HW interrupt can be suppressed.

Here, in a case in which the polling thread originally sleeps, making the polling thread sleep after a lapse of the certain time "t" results in shortening the sleep time. However, because the HW interrupt has a large delay, in consideration of the fact that the polling thread is awoken from sleep by the HW interrupt every time, it is more efficient in total to keep some time before entering sleep.

Note that the certain time "t" may be zero. When the certain time "t" is set to zero, the effect of suppressing excessive HW interrupt of this embodiment cannot be obtained, but the flow of FIG. 9 can be executed constantly. That is, when the certain time "t" is set to zero, an effect substantially equivalent to that in a case in which the present system is not applied is obtained. This eliminates the need for processing of determining whether or not to execute the flow of FIG. 9. That is, because it is only necessary to change the setting of "t", it is possible to implement the present technology in a versatile manner without modifying an existing system.

Further, while the time "t" mentioned above is referred to as a certain time for convenience of description, "t" is not limited to the certain time, and may be a variable time (predetermined time). For example, "t" may be determined by learning from input traffic characteristics, or the value of t may be gradually increased every time the loop of the flow of FIG. 9 is repeated (for example, every 1 μs). When the mode of gradually increasing the value of t is adopted, in a case in which the HW interrupt frequency f is equal to or greater than the threshold, the time until sleep can be further increased in accordance with the current state of packet arrival, and excessive HW interrupt suppression can be achieved.

Incidentally, it has been confirmed that the deterioration of delay time due to execution of the flow of sleep control in FIG. 9 is only deterioration of delay time of about several microseconds on average according to actual measurement by the present inventors. This is a small overhead when viewed as a single event, similar to waking up due to a hardware interrupt.

Note that although the example in which the effect is exerted in the case of FIG. 7 where the packet arrival is "medium" has been described, there is a similar chance to make the polling thread sleep and wake it up with hardIRQ also in the case of FIG. 7 where the packet arrival is "dense". Therefore, in the case in which the packet arrival is "dense", too, the effect of the present invention by the frequency control with hardIRQ can be expected.

[Hardware Configuration]

Figure 10:
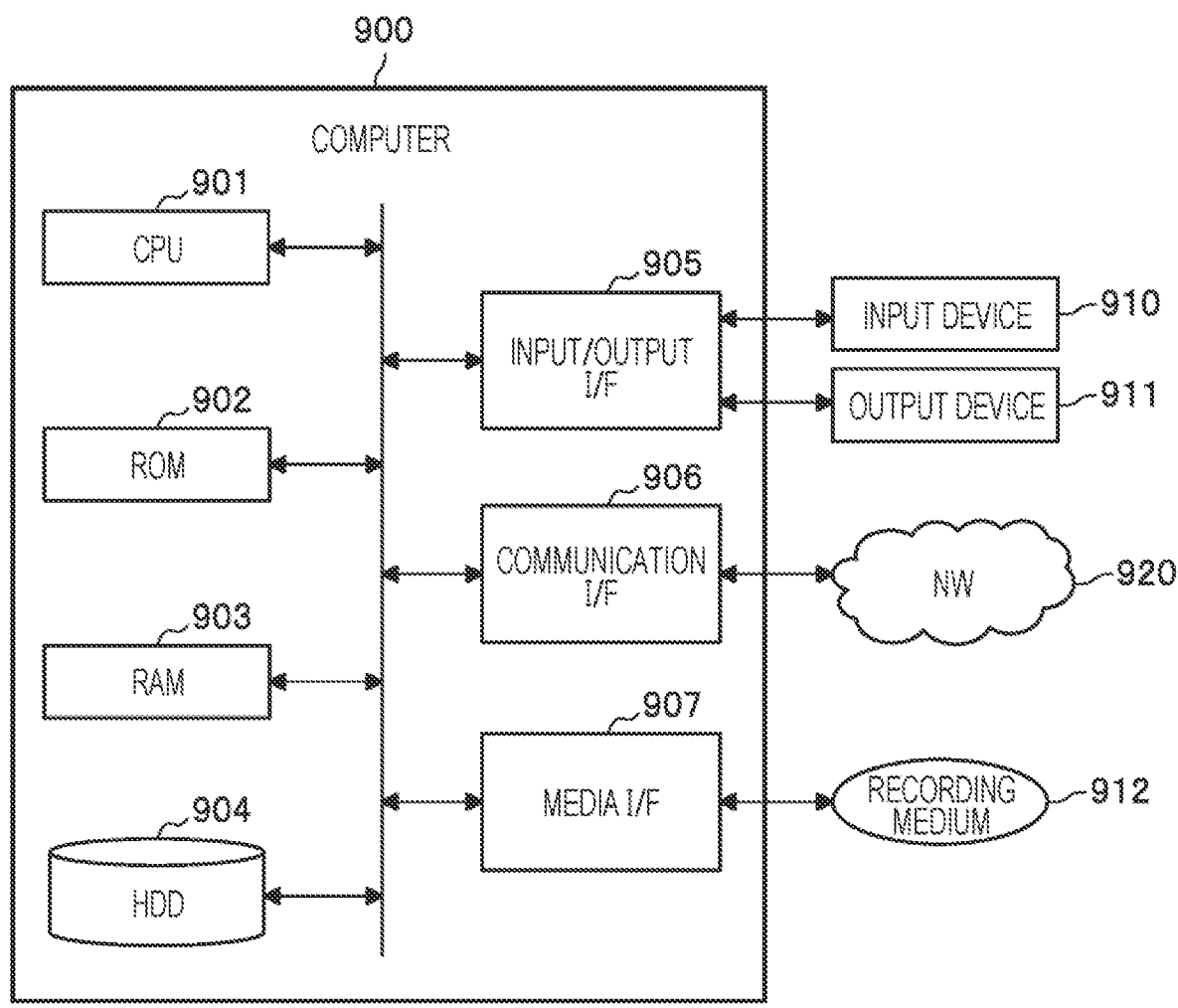
FIG. 10 is a hardware configuration diagram illustrating an example of a computer that implements the functions of the server delay controller of the server delay control system according to the embodiment of the present invention.

The server delay controller 100 according to the above embodiment is implemented by a computer 900 having a configuration as illustrated in FIG. 10, for example.

FIG. 10 is a hardware configuration diagram illustrating an example of the computer 900 that has the functions of the server delay controller 100.

The computer 900 includes a CPU 901, a ROM 902, a RAM 903, an HDD 904, a communication interface (I/F) 906, an input/output interface (I/F) 905, and a media interface (I/F) 907.

The CPU 901 operates on the basis of a program stored in the ROM 902 or the HDD 904, and controls the components of the server delay controller 100 illustrated in FIGS. 1 to 3. The ROM 902 stores a boot program to be executed by the CPU 901 when the computer 900 is activated, a program depending on the hardware of the computer 900, and the like.

The CPU 901 controls, via the input/output I/F 905, an input device 910 such as a mouse or a keyboard, and an output device 911 such as a display. Via the input/output I/F 905, the CPU 901 acquires data from the input device 910, and outputs generated data to the output device 911. Note that a graphics processing unit (GPU) or the like may be used as a processor in conjunction with the CPU 901.

The HDD 904 stores a program to be executed by the CPU 901, data to be used by the program, and the like. The communication I/F 906 receives data from another device via a communication network (for example, network (NW) 920), outputs the data to the CPU 901, and transmits data generated by the CPU 901 to another device via the communication network.

The media I/F 907 reads a program or data stored in a recording medium 912, and outputs the program or data to the CPU 901 via the RAM 903. The CPU 901 loads a program related to target processing from the recording medium 912 into the RAM 903 via the media I/F 907, and executes the loaded program. The recording medium 912 is an optical recording medium such as a digital versatile disc (DVD) or a phase change rewritable disk (PD), a magneto-optical recording medium such as a magneto optical disk (MO), a magnetic recording medium, a conductor memory tape medium, a semiconductor memory, or the like.

For example, in a case in which the computer 900 functions as the server delay controller 100 designed as a device according to this embodiment, the CPU 901 of the computer 900 implements the functions of the server delay controller 100 by executing a program loaded into the RAM 903. Further, the HDD 904 stores the data in the RAM 903. The CPU 901 reads the program related to the target processing from the recording medium 912, and executes the program. Additionally, the CPU 901 may read the program related to the target processing from another device via the communication network (NW 920).

Application Example

As in the case of the polling thread (server delay controller 100) illustrated in FIG. 2, the invention is applicable to a server delay controller that starts a thread that monitors packet arrival with a polling model in a kernel. In this case, the OS is not limited. Also, the environment is not limited to a server virtualized environment. Therefore, the server delay control system 1000 can be applied to the configurations illustrated in FIGS. 11 and 12.

<Example Application to VM Configuration>

Figure 11:
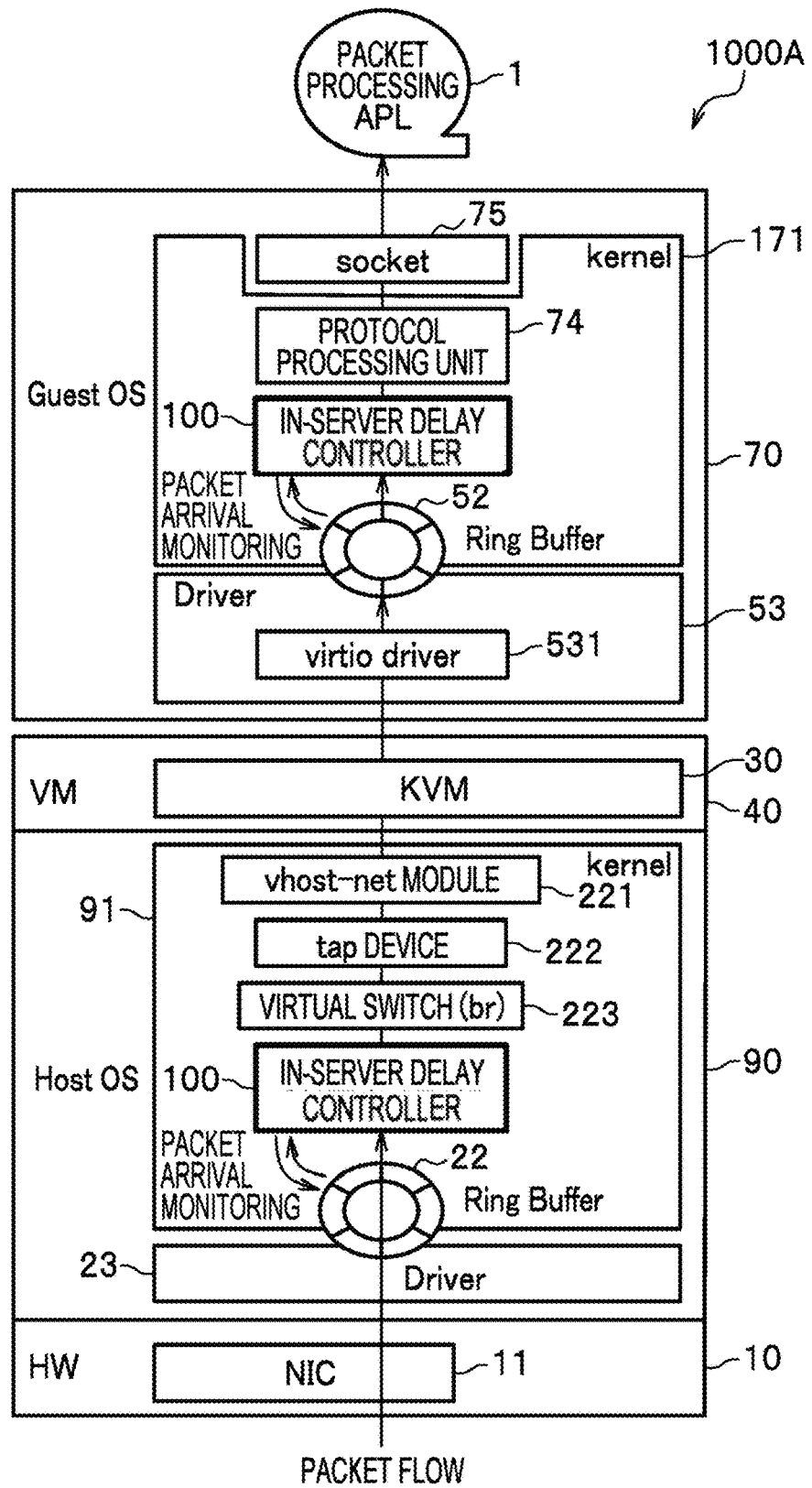
FIG. 11 is a diagram illustrating an example in which a server delay control system is applied to an interrupt model in a server virtualized environment configured by a general-purpose Linux kernel (registered trademark) and a VM.

FIG. 11 is a diagram illustrating an example in which a server delay control system 1000A is applied to an interrupt model in a server virtualized environment of a general-purpose Linux kernel (registered trademark) and a VM configuration. The same components as those in FIG. 1 are denoted by the same reference signs as those in FIG. 1.

As illustrated in FIG. 11, in the server delay control system 1000A, a server delay controller 100 is arranged in a kernel 171 of a guest OS 70, and a server delay controller 100 is arranged in a kernel 91 of a host OS 90.

Specifically, the server includes the host OS 90 in which a virtual machine and an external process formed outside the virtual machine can operate, and the guest OS 70 that operates in a virtual machine.

The host OS 90 includes: the kernel 91; a ring buffer 22 that is managed by the kernel 91 in a memory space in the server including the host OS 90; a receive list 186 (FIG. 2) that registers net device information indicating which device a hardware interrupt (hardIRQ) from the NIC 11 comes from; a vhost-net module 221 that is a kernel thread; a tap device 222 that is a virtual interface created by the kernel 91; and a virtual switch (br) 223.

The kernel 91 includes a server delay controller 100.

The kernel 91 transmits a packet to a virtual machine 30 via the tap device 222.

Meanwhile, the guest OS 70 includes: a kernel 171; a ring buffer 52 that is managed by the kernel 171 in a memory space in the server including the guest OS 70; a receive list 186 (FIG. 2) that registers net device information indicating which device a hardware interrupt (hardIRQ) from the NIC 11 comes from; and a socket 75 that is an interface for the kernel 171 to perform inter-process communication.

The kernel 171 includes a server delay controller 100, and a protocol processing unit 74 that performs protocol processing of a packet that has been removed.

The kernel 171 transmits a packet to the packet processing APL 1 via the protocol processing unit 74.

Thus, in the system having a VM virtual server configuration, packet transfer can be performed with a shorter delay in the server without modification to the APL in both the host OS 90 and the guest OS 70.

<Example Application to Container Configuration>

Figure 12:
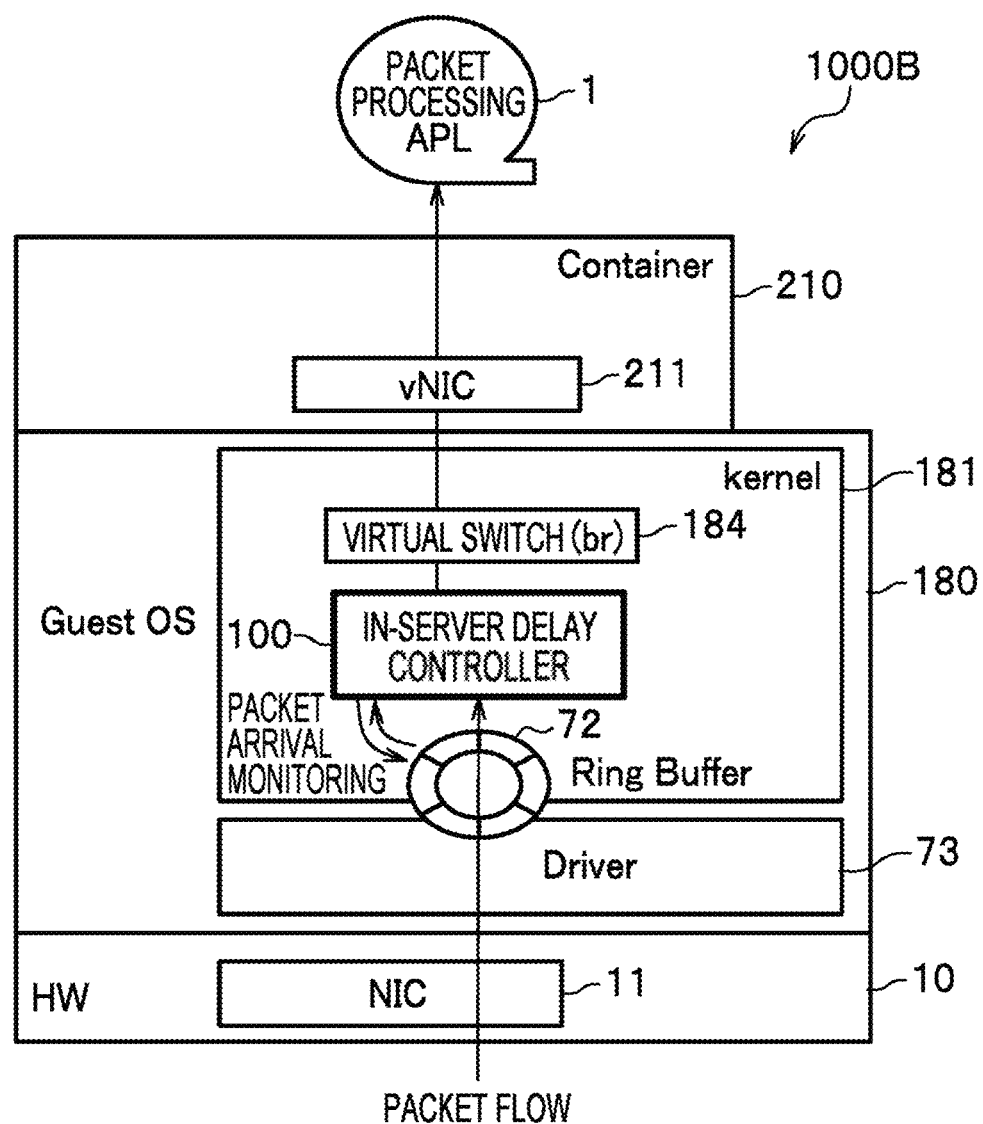
FIG. 12 is a diagram illustrating an example in which a server delay control system is applied to an interrupt model in a server virtualized environment of a container configuration.

FIG. 12 is a diagram illustrating an example in which a server delay control system 1000B is applied to an interrupt model in a server virtualized environment of a container configuration. The same components as those in FIG. 1 are denoted by the same reference signs as those in FIG. 1.

As illustrated in FIG. 12, the server delay control system 1000B includes a guest OS 180, and a container configuration in which the OS is replaced with a container 210. The container 210 includes a virtual NIC (vNIC) 211. A server delay controller 100 is arranged in a kernel 181 of the guest OS 180.

In a system having a virtual server configuration such as a container, packet transfer can be performed with a shorter delay in the server, without any modification to the APL.

<Example Application to Bare Metal Configuration (Non-Virtualized Configuration)>

The present invention can be applied to a system having a non-virtualized configuration such as a bare metal configuration. In a system having a non-virtualized configuration, packet transfer can be performed with a shorter delay in the server without modification to the APL.

<Scale in/Out>

In a case in which the amount of traffic is large and a plurality of NIC devices and NIC ports are used, it is possible to scale in/out the polling thread while performing HW interrupt frequency control by operating a plurality of polling threads in association with the NIC devices and the NIC ports.

<Extended Technology>

In a case in which the number of traffic flows increases, the present invention cooperates with receive-side scaling (RSS) capable of processing an inbound network traffic with a plurality of CPUs, to increase the number of CPUs to be assigned to the packet arrival monitoring thread. Thus, scaling out with respect to the network load becomes possible.

Effect

As described above, the server delay controller 100 (see FIGS. 1 and 2) that is arranged in a kernel space of the OS and starts a thread that monitors packet arrival using a polling model includes: the packet arrival monitoring unit 110 that monitors (polls) a poll list (receive list 186) that registers information of a network device indicating which device a hardware interrupt (hardIRQ) from an interface unit (NIC 11) comes from; the packet harvesting unit 120 that refers to a packet held in a ring buffer (ring buffer 72) when the packet arrives and executes harvesting of deleting an entry of a corresponding queue from the ring buffer on the basis of processing to be performed next; the sleep management unit 130 that makes a thread (polling thread) sleep when a packet does not arrive for a predetermined period, and cancels the sleep of the thread (polling thread) with a hardware interrupt (hardIRQ) at the time of packet arrival; the HW interrupt frequency storage unit (HW interrupt frequency management table 150*a*) that stores the number of hardware interrupts; and the HW interrupt frequency control unit 150 that calculates a HW interrupt frequency on the basis of the number of hardware interrupts and controls HW interrupt permission or prohibition by sleep of the sleep management unit 130 on the basis of the calculated HW interrupt frequency.

With this configuration, the server delay controller 100 stops a software interrupt (softIRQ) of packet processing that is a main cause of a NW delay, the packet arrival monitoring unit 110 of the server delay controller 100 executes the thread for monitoring packet arrival, and the packet harvesting unit 120 performs packet processing with a polling model (without any softIRQ) at the time of a packet arrival. Then, in a case in which no packet has arrived over a predetermined period, the sleep management unit 130 makes the thread (polling thread) sleep, so that the thread (polling thread) is in a sleep state when no packet arrives. The sleep management unit 130 cancels the sleep with a hardware interrupt (hardIRQ) when a packet arrives. Further, the HW interrupt frequency control unit 150 calculates the HW interrupt frequency on the basis of the HW interrupt frequency stored in the HW interrupt frequency storage unit (the HW interrupt frequency management table 150*a*), and controls the HW interrupt permission or prohibition by sleep of the sleep management unit 130 on the basis of the calculated HW interrupt frequency.

Thus, the effects (1) to (4) described below are achieved.

(1) The software interrupt (softIRQ) at the time of a packet arrival, which is the cause of a delay, is stopped, and a polling model is formed in the kernel (kernel 171). That is, unlike a NAPI of the existing technology, the server delay control system 1000 achieves not an interrupt model that is a main cause of a NW delay, but a polling model. At the time of a packet arrival, the packet is immediately removed without queuing, and thus, low-latency packet processing can be achieved.

(2) The polling thread in the server delay controller 100 operates as a kernel thread, and monitors packet arrival in a polling mode. The kernel thread (polling thread) that monitors packet arrival sleeps while there is no packet arrival. In a case in which there is no packet arrival, the CPU is not used during the sleep, and thus, a power saving effect can be achieved.

Then, when a packet arrives, the polling thread in a sleep state is awoken (the sleep is canceled) by the hardIRQ handler for the time of a packet arrival. As the sleep is canceled by the hardIRQ handler, the polling thread can be promptly activated while a softIRQ contention is avoided. Here, the technology is characterized in that the sleep is canceled not by a built-in timer, but by the hardIRQ handler. Note that in a case in which the traffic load is known in advance, such as a case in which 30 ms sleep is known as with the workload transfer rate shown in FIG. 15, for example, the polling thread may be awoken by the hardIRQ handler at this timing.

(3) Further, HW interrupt permission or prohibition by sleep of the sleep management unit 130 is controlled on the basis of the calculated HW interrupt frequency. As a result, it is possible to suppress an increase in delay time due to excessive occurrence of HW interrupt, which is one of overheads caused by making the polling thread sleep, and it is possible to achieve even lower latency.

(4) The present invention can be applied to a case in which there is a polling thread inside the kernel, such as NAPI or KBP.

As described above, in a case in which there is a polling thread inside the kernel, the server delay controller 100 (see FIG. 2) can achieve both low latency and power saving by performing sleep management on the polling thread that performs packet transfer processing. Furthermore, in a case in which a predetermined condition such as equivalence of the packet arrival speed and the packet reception speed is satisfied, it is possible to prevent an increase in the number of times of HW interrupt due to packet arrival and an increase in the packet transfer delay time.

In addition, the server delay controller 100 (see FIGS. 1 and 3) that is arranged in a user space and starts a thread that monitors packet arrival using a polling model includes: the packet arrival monitoring unit 110 that monitors (polls) a poll list (receive list 186) that registers information of a network device indicating which device a hardware interrupt (hardIRQ) from an interface unit (NIC 11) comes from; the packet harvesting unit 120 that refers to a packet held in a ring buffer (ring buffer 72) when the packet arrives and executes harvesting of deleting an entry of a corresponding queue from the ring buffer on the basis of processing to be performed next; the sleep management unit 130 that makes a thread (polling thread) sleep when no packet arrives for a predetermined period, and cancels the sleep of the thread (polling thread) by a hardware interrupt (hardIRQ) when a packet arrives; the HW interrupt frequency storage unit (HW interrupt frequency management table 150a) that stores the number of hardware interrupts; and the HW interrupt frequency control unit 150 that calculates a HW interrupt frequency on the basis of the number of hardware interrupts and controls HW interrupt permission or prohibition by sleep of the sleep management unit 130 on the basis of the calculated HW interrupt frequency.

With this configuration, in a case in which there is a polling thread in the user space as in the DPDK, the server delay controller 100 (see FIG. 3) can achieve both low latency and power saving by performing sleep management of the polling thread that performs packet transfer processing. Furthermore, in a case in which a predetermined condition such as equivalence of the packet arrival speed and the packet reception speed is satisfied, it is possible to suppress an increase in delay time due to excessive occurrence of HW interrupt, and it is possible to achieve even lower latency.

Also, a guest OS (guest OS 70) that operates in a virtual machine includes: a kernel (kernel 171); a ring buffer (ring buffer 72) that is managed by the kernel in a memory space in a server including the guest OS; a poll list (poll_list 186) that registers network device information indicating which device a hardware interrupt (hardIRQ) from an interface unit (NIC 11) comes from; and the protocol processing unit 74 that performs protocol processing on a packet subjected to harvesting. A server delay controller 100 that activates a thread that monitors packet arrival using a polling model is arranged in the kernel. The server delay controller 100 includes: the packet arrival monitoring unit 110 that monitors (polls) a poll list; the packet harvesting unit 120 that refers to a packet held in the ring buffer and performs harvesting of deleting an entry of a corresponding queue from the ring buffer on the basis of processing to be performed next in a case in which the packet has arrived; the sleep management unit 130 that makes the thread (polling thread) sleep in a case in which no packet arrives over a predetermined period, and cancels the sleep with a hardware interrupt (hardIRQ) of the thread (polling thread) when a packet arrives; the HW interrupt frequency storage unit (HW interrupt frequency management table 150a) that stores the number of hardware interrupts; and the HW interrupt frequency control unit 150 that calculates a HW interrupt frequency on the basis of the number of hardware interrupts and controls HW interrupt permission or prohibition by sleep of the sleep management unit 130 on the basis of the calculated HW interrupt frequency.

Thus, in a system having a VM virtual server configuration, packet transfer with a shorter delay in the server including the guest OS (guest OS 70) can be performed without modification to the APL, while power consumption is lowered. Furthermore, in a case in which a predetermined condition such as equivalence of the packet arrival speed and the packet reception speed is satisfied, it is possible to suppress an increase in delay time due to excessive occurrence of HW interrupt, and it is possible to achieve even lower latency.

Also, a host OS (host OS 90) in which a virtual machine and an external process formed outside the virtual machine can operate includes: a kernel (kernel 91); a ring buffer (ring buffer 22) that is managed by the kernel in a memory space in the server including the host OS; a poll list (poll_list 186) that registers network device information indicating which device a hardware interrupt (hardIRQ) from an interface unit (NIC 11) comes from; and the tap device 222 that is a virtual interface created by the kernel (kernel 91). A server delay controller 100 that activates a thread that monitors packet arrival using a polling model is arranged in the kernel. The server delay controller 100 includes: the packet arrival monitoring unit 110 that monitors (polls) a poll list; the packet harvesting unit 120 that refers to a packet held in a ring buffer (ring buffer 72) and performs harvesting of deleting an entry of a corresponding queue from the ring buffer (ring buffer 72) on the basis of processing to be performed next in a case in which the packet has arrived; the sleep management unit 130 that makes the thread (polling thread) sleep in a case in which no packet arrives over a predetermined period, and cancels the sleep with a hardware interrupt (hardIRQ) of the thread (polling thread) when a packet arrives; and the HW interrupt frequency control unit 150 that calculates a HW interrupt frequency on the basis of the number of hardware interrupts and controls HW interrupt permission or prohibition by sleep of the sleep management unit 130 on the basis of the calculated HW interrupt frequency.

Thus, in a system having a VM virtual server configuration, packet transfer with a shorter delay in the server including the kernel (kernel 171) and the host OS (host OS 90) can be performed without modification to the APL, while power consumption is lowered. Furthermore, in a case in which a predetermined condition such as equivalence of the packet arrival speed and the packet reception speed is satisfied, it is possible to suppress an increase in delay time due to excessive occurrence of HW interrupt, and it is possible to achieve even lower latency.

In the server delay controller 100, the HW interrupt frequency control unit 150 compares the calculated HW interrupt frequency with a predetermined threshold, and does not cause the sleep management unit 130 to execute sleep for a certain time when the HW interrupt frequency is smaller than the predetermined threshold.

With this configuration, in a case in which a predetermined condition such as equivalence of the packet arrival speed and the packet reception speed is satisfied, it is possible to suppress an increase in delay time due to excessive occurrence of HW interrupt, and it is possible to achieve even lower latency.

Other Effects

In the server delay control system including the server delay controller 100, the interface unit (NIC 11) stops the scheduling by the software interrupt when starting the hardware interrupt in the interrupt handler (hardIRQ 81) and registering the device in the poll list.

As a result, the softIRQ that becomes the cause of delay occurrence is stopped, and instead, packet processing is performed in the context of the hardIRQ that has a high priority by the timer trigger, so that the softIRQ contention can be avoided.

In this embodiment, the server delay controller 100 includes a CPU frequency setting unit (CPU frequency/CPU idle setting unit 140) that sets a low frequency as the CPU operation frequency in the CPU core to be used by the thread during sleep.

As described above, if the CPU operation frequency is dynamically changed in accordance with the traffic, or if the CPU is not used during sleep, the server delay controller 100 sets a low frequency as the CPU operation frequency during sleep, so that the power saving effect can be further enhanced.

In this embodiment, the server delay controller 100 includes a CPU idle setting unit (CPU frequency/CPU idle setting unit 140) that sets a CPU idle state of the CPU core to be used by the thread during sleep as power-saving mode.

As a result, the server delay controller 100 dynamically changes the CPU idle state (a power saving function depending on the type of CPU, such as changing the operating voltage) in accordance with the traffic, so that the power saving effect can be further enhanced.

Note that, among the processing described in the above embodiment, all or some of the processing described as those to be automatically performed may be manually performed, or all or some of the processing described as those to be manually performed may be automatically performed by a known method. In addition to this, information including the processing procedures, the control procedures, the specific names, the various kinds of data, and the parameters mentioned above in the specification or shown in the drawings can be modified as desired, unless otherwise particularly specified.

In addition, each component of each device that has been illustrated is functionally conceptual, and is not necessarily physically configured as illustrated. In other words, a specific form of distribution and integration of individual devices is not limited to the illustrated form, and all or part of the configuration can be functionally or physically distributed and integrated in any unit according to various loads, usage conditions, and the like.

Further, some or all of the component, functions, processing units, processing means, and the like described above may be implemented by hardware, for example, by designing them in an integrated circuit. Also, the components, functions, and the like may be implemented by software for interpreting and executing a program for causing a processor to implement the functions. Information such as a program, a table, and a file for implementing the functions can be held in a recording device such as a memory, a hard disk, or a solid state drive (SSD), or in a recording medium such as an integrated circuit (IC) card, a secure digital (SD) card, or an optical disc.

REFERENCE SIGNS LIST

1: Packet processing application (APL)
10: HW
11: NIC (physical NIC, interface unit)
70: Guest OS
74: Protocol processing unit
60: User space
72: Ring buffer
90: Host OS (OS)
91, 171, 181: Kernel
100: Server delay controller (polling thread)
110: Packet arrival monitoring unit
120: Packet harvesting unit
130: Sleep management unit
140: CPU frequency/CPU idle setting unit
150: HW interrupt frequency control unit
150a: HW interrupt frequency management table (HW interrupt frequency storage unit)
180: Guest OS (OS)
186: Receive list (poll list)
210: Container
1000, 1000A, 1000B: Server delay control system

The invention claimed is:

1. A non-transitory computer-readable storage medium storing instructions that upon execution, cause a computer to operate as a server delay controller that is arranged in a kernel space of an operating system (OS) and starts a thread that monitors packet arrival using a polling model, wherein execution of the instructions causes the computer operating as the server delay controller to perform operations comprising:
   monitoring a poll list that registers network device information indicating which device a hardware interrupt from an interface unit comes from;
   referring to a packet held in a ring buffer and performing harvesting of deleting an entry of a corresponding queue from the ring buffer on a basis of processing to be performed next in a case where a packet has arrived;
   making the thread sleep in a case where no packet arrives for a predetermined period, and cancelling the sleep of the thread with a hardware interrupt when the packet arrives;
   storing number of times of hardware interrupt; and
   calculating a hardware (HW) interrupt frequency on a basis of number of times of hardware interrupt, and controlling HW interrupt permission or prohibition by the making the thread sleep on a basis of the HW interrupt frequency calculated.

2. The non-transitory computer-readable storage medium according to claim 1, wherein
   the controlling HW interrupt permission or prohibition includes comparing the HW interrupt frequency calculated with a predetermined threshold, and does not cause the thread to sleep for a certain time when the HW interrupt frequency is smaller than the predetermined threshold.

3. A device including the computer and the non-transitory computer-readable storage medium storing the instructions according to claim 1.

4. A non-transitory computer-readable storage medium storing instructions that upon execution, cause a computer to operate as a server delay controller that is arranged in a user space and starts a thread that monitors packet arrival using a polling model, wherein execution of the instructions causes the computer operating as the server delay controller comprising:
   monitoring a poll list that registers network device information indicating which device a hardware interrupt from an interface unit comes from;
   referring to a packet held in a ring buffer and performing harvesting of deleting an entry of a corresponding queue from the ring buffer on a basis of processing to be performed next in a case where a packet has arrived;
   making the thread sleep in a case where no packet arrives for a predetermined period, and cancelling the sleep of the thread with a hardware interrupt when the packet arrives;
   storing a number of times of hardware interrupt; and
   calculating a hardware (HW) interrupt frequency on a basis of number of times of hardware interrupt, and controlling HW interrupt permission or prohibition the making the thread sleep on a basis of the HW interrupt frequency calculated.

5. A non-transitory computer-readable storage medium storing instructions that upon execution, cause a computer to operate as a server delay controller included in a kernel, wherein
   a guest operating system (OS) that operates in a virtual machine includes:
   the kernel;
   a ring buffer that is managed by the kernel in a memory space in a server including the guest OS;

a poll list that registers network device information indicating which device a hardware interrupt from an interface unit comes from; and a protocol processor configured to perform protocol processing on a packet subjected to harvesting, the kernel including the server delay controller that starts a thread that monitors packet arrival using a polling model, wherein executing of the instructions causes the computer operating as the server delay controller to perform operations comprising:

monitoring packet arrival with the poll list;

referring to a packet held in the ring buffer and performing removal of deleting an entry of a corresponding queue from the ring buffer on a basis of processing to be performed next in a case where a packet has arrived;

making the thread sleep when no packet arrives over a predetermined period, and cancelling the sleep of the thread with a hardware interrupt when a packet arrives;

storing a number of times of hardware interrupt; and calculating a hardware (HW) interrupt frequency on a basis of the number of times of hardware interrupt, and controlling HW interrupt permission or prohibition by the making the thread sleep on a basis of the HW interrupt frequency calculated.

6. A non-transitory computer-readable storage medium storing instructions that upon execution, cause a computer to operate as a server delay controlling device included in a kernel, wherein a host OS in which a virtual machine and an external process formed outside the virtual machine are able to operate, including:

the kernel;

a ring buffer that is managed by the kernel in a memory space in a server including the host OS;

a poll list that registers network device information indicating which device a hardware interrupt from an interface unit comes from; and a tap that is a virtual interface created by the kernel, the kernel including the server delay controller that starts a thread that monitors packet arrival using a polling model, wherein execution of the instructions causes the computer operating as the server delay controller to perform operations comprising:

monitoring packet arrival with the poll list;

referring to a packet held in the ring buffer and performing harvesting of deleting an entry of a corresponding queue from the ring buffer on a basis of processing to be performed next in a case where a packet has arrived;

making the thread sleep when no packet arrives over a predetermined period, and cancelling the sleep of the thread with a hardware interrupt when a packet arrives;

storing number of times of hardware interrupt; and calculating a hardware (HW) interrupt frequency on a basis of number of times of hardware interrupt, and controlling HW interrupt permission or prohibition by the making the thread sleep on a basis of the HW interrupt frequency calculated.

7. A server delay control method of a server delay controller that is arranged in a kernel space of an OS, implemented by a computer when the computer executes instructions, and starts a thread that monitors packet arrival using a polling model, the server delay controller executing:

monitoring a poll list that registers network device information indicating which device a hardware interrupt from an interface unit comes from;

referring to a packet held in a ring buffer and harvesting of deleting an entry of a corresponding queue from the ring buffer on a basis of processing to be performed next in a case where a packet has arrived;

making the thread sleep in a case where no packet arrives for a predetermined period, and cancelling the sleep of the thread with a hardware interrupt when the packet arrives;

storing number of times of hardware interrupt; and calculating a hardware (HW) interrupt frequency on a basis of number of times of hardware interrupt, and controlling HW interrupt permission or prohibition by the making the thread sleep on a basis of the HW interrupt frequency calculated.

* * * * *